United States Patent
Otani et al.

(10) Patent No.: US 6,741,810 B2
(45) Date of Patent: May 25, 2004

(54) SIGNAL DEMULTIPLEXING DEVICE AND SIGNAL ROUTING DEVICE IN HIGH SPEED TRANSMISSION SYSTEM

(75) Inventors: Tomohiro Otani, Omiya (JP); Tetsuya Miyazaki, Tokyo (JP); Shu Yamamoto, Shiki (JP)

(73) Assignees: DDI Corporation, Tokyo (JP); KDD Submarine Cable Systems, Inc., Tokyo (JP)

( * ) Notice: Subject to any disclaimer, the term of this patent is extended or adjusted under 35 U.S.C. 154(b) by 578 days.

(21) Appl. No.: 09/784,558

(22) Filed: Feb. 15, 2001

(65) Prior Publication Data

US 2001/0021046 A1 Sep. 13, 2001

(30) Foreign Application Priority Data

Feb. 16, 2000 (JP) ...................... P2000-038612

(51) Int. Cl.[7] ................................ H04J 14/08
(52) U.S. Cl. ............... 398/47; 398/43; 398/74; 398/75; 398/52; 398/53; 398/98
(58) Field of Search .................. 398/43, 47, 74, 398/75, 52, 53, 98, 101, 102

(56) References Cited

U.S. PATENT DOCUMENTS 5,438,444 A * 8/1995 Tayonaka et al. .............. 398/75
5,953,142 A * 9/1999 Chiaroni et al. ............... 398/82

FOREIGN PATENT DOCUMENTS

EP          0 697775 A2    2/1996

* cited by examiner

Primary Examiner—Jason Chan
Assistant Examiner—David C. Payne
(74) Attorney, Agent, or Firm—Olson & Hierl, Ltd.

(57) ABSTRACT

In a signal demultiplexing device formed by a probe light source, a wavelength converter, and a wavelength demultiplexer, the probe light source is formed by a plurality of sub-probe light sources configured to respectively generate the sub-probe lights with the prescribed different wavelengths for respective time-slots, a multiplexer configured to multiplex the sub-probe lights generated by the plurality of sub-probe light sources, and a phase different giving unit configured to give phase differences corresponding to time-slot positions to the sub-probe lights multiplexed by the multiplexer, and to sequentially output the sub-probe lights with the phase differences in correspondence to respective time-slots.

4 Claims, 12 Drawing Sheets

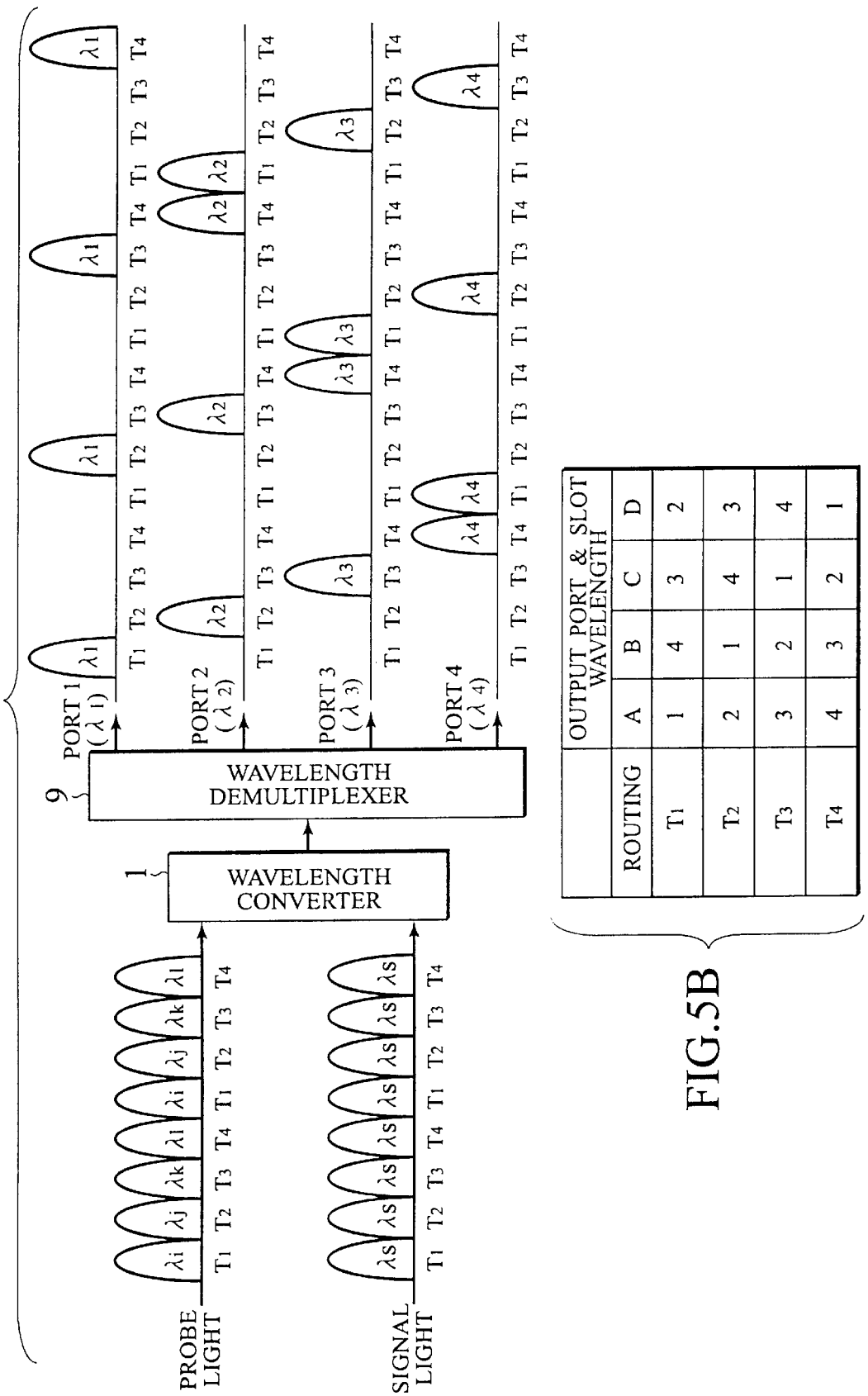

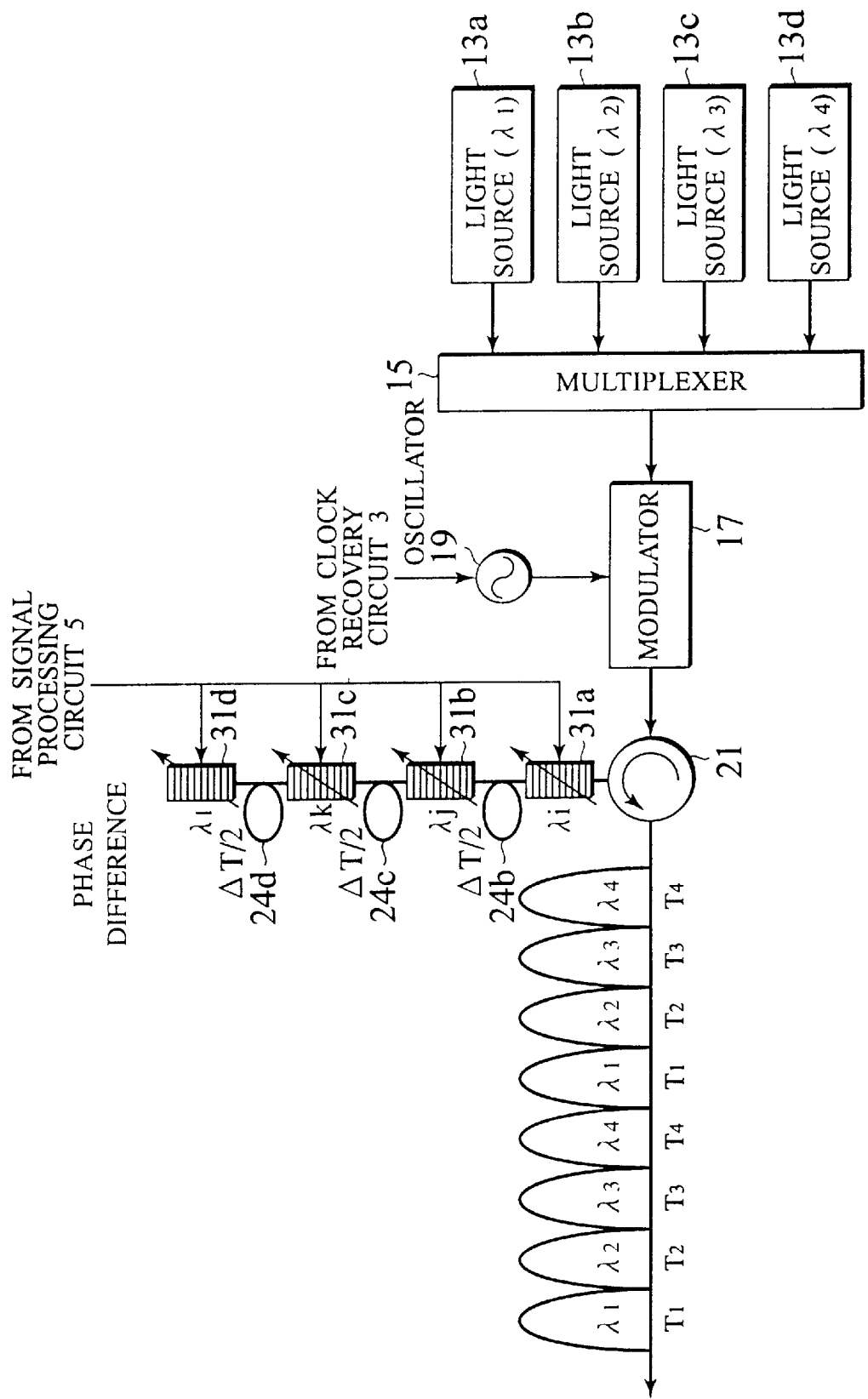

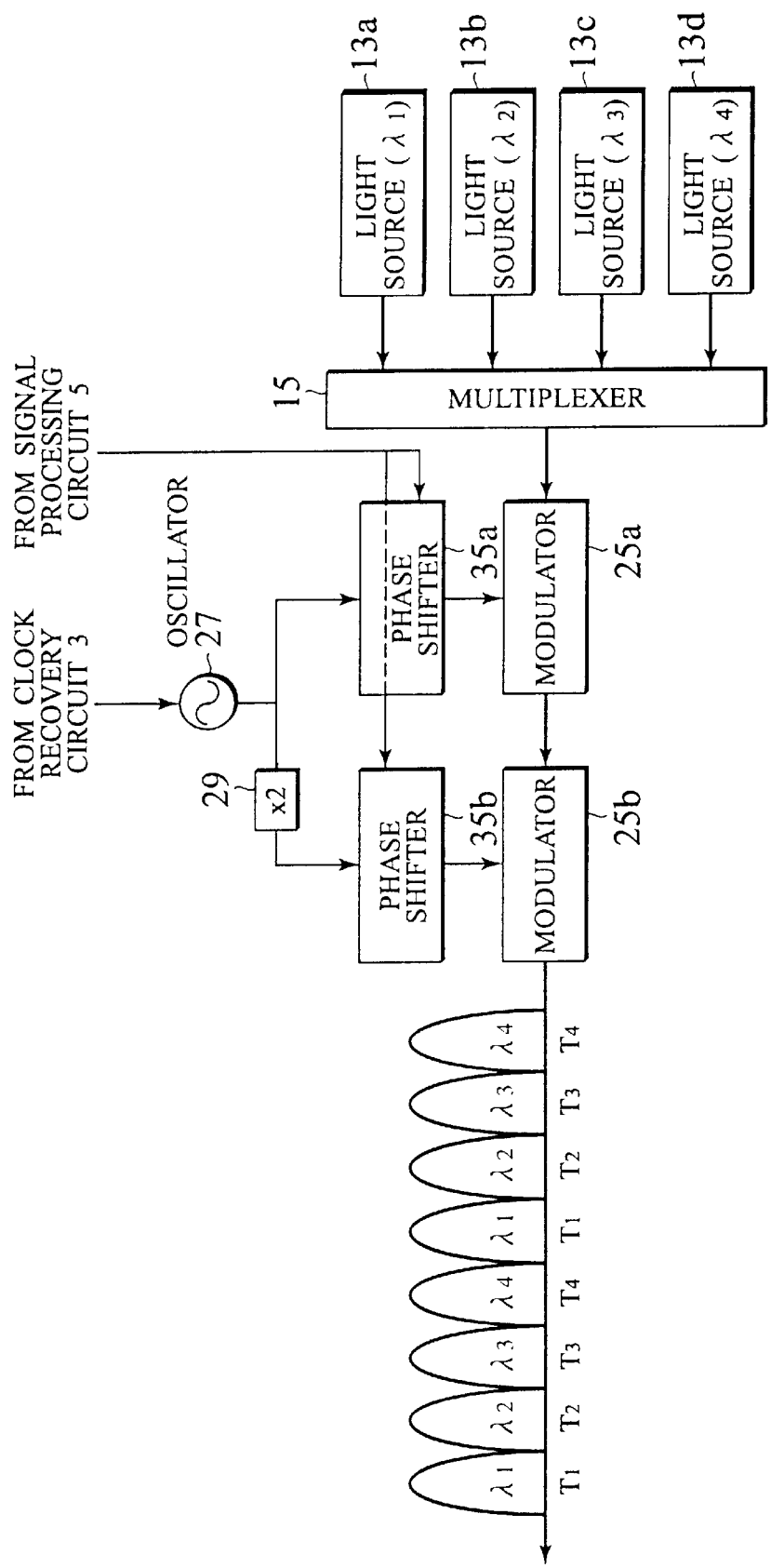

WAVELENGTH CHARACTERISTIC
OF MODULATOR 25a

WAVELENGTH CHARACTERISTIC
OF MODULATOR 25b

TIME CHARACTERISTIC
OF MODULATOR 25a

TIME CHARACTERISTIC
OF MODULATOR 25b

SIGNAL DEMULTIPLEXING DEVICE AND SIGNAL ROUTING DEVICE IN HIGH SPEED TRANSMISSION SYSTEM

BACKGROUND OF THE INVENTION

1. Field of the Invention

The present invention relates to a signal demultiplexing device and a signal routing device in a high speed transmission system, for time division demultiplexing a series of high speed multiplexed signal lights in which signal lights with a prescribed identical frequency, i.e., identical wavelength, are time division multiplexed in terms of time-slots, by converting them into low speed wavelength division multiplexed signal lights, and outputting signal lights of desired wavelengths that constitute the low speed wavelength division multiplexed signals by distributing them in desired time-slots.

2. Description of the Background Art

A conventional signal demultiplexing device of this type is as shown in FIG. 11, for example. In this conventional signal demultiplexing device of FIG. 11, high speed multiplexed signal lights constituting a series of signal lights that are time division multiplexed in terms of time-slots T1, T2, T3 and T4 are distributed by a distributor 61 and a plurality of distributed signal lights are respectively supplied to a plurality of separators 63a, 63b, 63c and 63d.

On the other hand, a prescribed phase difference $\Delta T$ corresponding to a time interval between adjacent time-slots is sequentially given by phase difference giving elements 67a, 67b and 67c such as delay lines, with respect to a series of signals sequentially outputted from an oscillator 65, so as to sequentially generate time division demultiplexing signals with phases coinciding with those of the time-slots. This series of time division demultiplexing signals are respectively supplied to the plurality of separators 63d, 63c, 63b and 63a where signal lights of the respective time-slots are extracted by using the time division demultiplexing signals, and the signal lights of the respective time-slots T1, T2, T3 and T4 are received by a plurality of receivers 69a, 69b, 69c and 69d respectively.

The conventional signal demultiplexing device in such a configuration requires a plurality of separators 63a to 63d which are time division demultiplexing elements for the purpose of extracting the respective time-slots, and there is a need to align phases of the respective time-slots with phases at respective separators, while the time-slot demultiplexing speed is limited by the separators 63a to 63d that are the time division demultiplexing elements.

FIG. 2 shows a configuration of a signal demultiplexing device using a wavelength converter. This signal demultiplexing device of FIG. 2 has a wavelength converter 1 into which signal lights with a prescribed identical wavelength $\lambda s$ that are high speed time division multiplexed signal lights multiplexed in terms of time-slots T1, T2, T3 and T4 are inputted, and probe lights that are low speed wavelength division multiplexed signal lights comprising a series of sub-probe lights with prescribed different wavelengths $\lambda 1$, $\lambda 2$, $\lambda 3$ and $\lambda 4$ for respective time-slots T1, T2, T3 and T4 that are synchronized with the high speed time division multiplexed signal lights are also inputted. In this wavelength converter 1, the prescribed wavelength $\lambda s$ of each signal light in each time-slot is converted into a desired wavelength $\lambda i$ (i=1, 2, 3, 4) of the probe light in the corresponding time-slot Ti (i=1, 2, 3, 4), and resulting wavelength division multiplexed signal lights are supplied to a wavelength demultiplexer 9.

Then, at the wavelength demultiplexer 9, the wavelength division multiplexed signal lights from the wavelength converter 1 are demultiplexed, and as outputs of the wavelength demultiplexer 9 shown in FIG. 2, a signal light with a wavelength $\lambda 1$ is outputted to the time-slot T1 from a first port of the wavelength demultiplexer 9 and received by a receiver 11a, a signal light with a wavelength $\lambda 2$ is outputted to the time-slot T2 from a second port of the wavelength demultiplexer 9 and received by a receiver 11b, a signal light with a wavelength $\lambda 3$ is outputted to the time-slot T3 from a third port of the wavelength demultiplexer 9 and received by a receiver 11c, and a signal light with a wavelength $\lambda 4$ is outputted to the time-slot T4 from a fourth port of the wavelength demultiplexer 9 and received by a receiver 11d.

Note that the probe lights constituting the low speed wavelength division multiplexed signal lights are applied with a clock modulation at a divided frequency of the high speed time division multiplexed signal lights, and a phase relationship adjustment such that bits are in complementary relationship, thereby converting the high speed time division multiplexed signal lights into the wavelength division multiplexed signal lights which are them wavelength demultiplexed and received by the respective receivers 11a, 11b, 11c and 11d.

In the signal demultiplexing device using the wavelength converter described above, the probe lights that are low speed signals can be generated conventionally by an individual modulation scheme using electrically generated phase differences, an individual modulation scheme using optically generated phase differences, or a collective modulation scheme, and each of these schemes will be described next.

FIG. 12 shows a circuit configuration of a conventional probe light source for realizing the individual modulation scheme using electrically generated phase difference mentioned above. The probe light source of FIG. 12 has a plurality of sub-probe light sources 13a, 13b, 13c and 13d for respectively generating sub-probe lights with prescribed different wavelengths $\lambda 1$, $\lambda 2$, $\lambda 3$ and $\lambda 4$ for respective time-slots T1, T2, T3 and T4, and the sub-probe lights with wavelengths $\lambda 1$, $\lambda 2$, $\lambda 3$ and $\lambda 4$ outputted from these sub-probe light sources 13a, 13b, 13c and 13d are respectively supplied to modulators 71a, 71b, 71c and 71d.

On the other hand, a prescribed phase difference $\Delta T$ corresponding to a time interval between adjacent time-slots is sequentially given by electric phase difference giving elements 67a, 67b and 67c such as delay lines, with respect to a series of signals sequentially outputted from an oscillator 65, so as to sequentially generate phase adjustment signals with phases coinciding with those of the time-slots. This series of phase adjustment signals are supplied to the respective modulators 71a, 71b, 71c and 71d where phases of the sub-probe lights from the sub-probe light sources 13a, 13b, 13c and 13d are adjusted, and the phase adjusted sub-probe lights are multiplexed by a multiplexer 73, and the probe lights comprising a series of sub-probe lights with different wavelengths $\lambda 1$, $\lambda 2$, $\lambda 3$ and $\lambda 4$ for the respective time-slots T1, T2, T3 and T4 which are synchronized with the respective time-slots T1, T2, T3 and T4 are outputted from the multiplexer 73.

FIG. 13 shows a circuit configuration of a conventional probe light source for realizing the individual modulation scheme using optically generated phase difference mentioned above. The probe light source of FIG. 13 uses a plurality of optical fibers 75a, 75b, 75c and 75d with different lengths for optically generating phase differences, instead of the electric phase difference giving elements 67a, 67b and 67c used in the conventional probe light source shown in FIG. 12, such that a sub-probe light with a wavelength λ1 transmitted from the sub-probe light source 13a through the modulator 71a is inputted into the multiplexer 73 without any delay by an optical fiber 75a, a sub-probe light with a wavelength λ2 transmitted from the sub-probe light source 13b through the modulator 71b is inputted into the multiplexer 73 with a delay of ΔT by an optical fiber 75b, a sub-probe light with a wavelength λ3 transmitted from the sub-probe light source 13c through the modulator 71c is inputted into the multiplexer 73 with a delay of 2ΔT by an optical fiber 75c, and a sub-probe light with a wavelength λ4 transmitted from the sub-probe light source 13d through the modulator 71d is inputted into the multiplexer 73 with a delay of 3ΔT by an optical fiber 75d. Then, the probe lights comprising a series of sub-probe lights with different wavelengths λ1, λ2, λ3 and λ4 for the respective time-slots T1, T2, T3 and T4 are outputted from the multiplexer 73.

FIG. 14 shows a circuit configuration of a conventional probe light source for realizing the collective modulation scheme mentioned above. The probe light source of FIG. 14 multiplexes the sub-probe lights with wavelengths λ1, λ2, λ3 and λ4 from the plurality of sub-probe light sources 13a, 13b, 13c and 13d at a multiplexer 77, and applies a collective modulation to the multiplexed sub-probe lights at an oscillator driven modulator 79. Then, these sub-probe lights are wavelength demultiplexed at a demultiplexer 81, and necessary phase differences are given to the respective wavelength demultiplexed sub-probe lights by optical fibers 83a, 83b, 83c and 83d. Then, these sub-probe lights are multiplexed at a multiplexer 85, and the probe lights comprising a series of sub-probe lights with different wavelengths λ1, λ2, λ3 and λ4 for the respective time-slots T1, T2, T3 and T4 are outputted from the multiplexer 85.

Now, the conventional probe light sources used for the signal demultiplexing device using the wavelength converter described above are associated with problems that there is a need to adjust a phase of the optical wavelength signal with respect to the respective time-slot individually, and that there is a possibility for increasing a scale of hardware regarding the wavelength multiplexing and demultiplexing.

SUMMARY OF THE INVENTION

It is therefore an object of the present invention to provide a signal demultiplexing device and a signal routing device in a high speed transmission system capable of handling the high speed multiplexed signal lights for which a processing using electric signals is impossible, by using a relatively simple circuit configuration.

According to one aspect of the present invention there is provided a signal demultiplexing device in a high speed transmission system, for time division demultiplexing high speed multiplexed signal lights in which signal lights with a prescribed identical wavelength are time division multiplexed in terms of time-slots, by converting the high speed multiplexed signal lights into low speed wavelength division multiplexed signal lights, the signal demultiplexing device comprising: a probe light source configured to generate probe lights formed by a series of sub-probe lights with prescribed different wavelengths for respective time-slots, in synchronization with the high speed multiplexed signal lights; a wavelength converter configured to receive the probe lights from the probe light source and the high speed multiplexed signal lights, and to convert the prescribed identical wavelength of the high speed multiplexed signal lights in each time-slot into a prescribed wavelength of a probe light in a corresponding time-slot so as to obtain wavelength division multiplexed signal lights; and a wavelength demultiplexer configured to wavelength division demultiplex the wavelength division multiplexed signal lights obtained by the wavelength converter, and to output demultiplexed signal lights; wherein the probe light source has: a plurality of sub-probe light sources configured to respectively generate the sub-probe lights with the prescribed different wavelengths for respective time-slots; a multiplexer configured to multiplex the sub-probe lights generated by the plurality of sub-probe light sources; and a phase different giving unit configured to give phase differences corresponding to time-slot positions to the sub-probe lights multiplexed by the multiplexer, and to sequentially output the sub-probe lights with the phase differences in correspondence to respective time-slots.

According to another aspect of the present invention there is provided a signal routing device in a high speed transmission system, for time division demultiplexing high speed multiplexed signal lights in which signal lights with a prescribed identical wavelength are time division multiplexed in terms of time-slots, by converting the high speed multiplexed signal lights into low speed wavelength division multiplexed signal lights, and for outputting signal lights by distributing signal lights with desired wavelengths that constitute the low speed wavelength division multiplexed signals into desired time-slots according to routing control signals, the signal routing device comprising: a probe light source configured to generate probe lights formed by a series of sub-probe lights with variable desired wavelengths for respective time-slots, in synchronization with the high speed multiplexed signal lights; a wavelength converter configured to receive the probe lights from the probe light source and the high speed multiplexed signal lights, and to convert the prescribed identical wavelength of the high speed multiplexed signal lights in each time-slot into a prescribed wavelength of a probe light in a corresponding time-slot so as to obtain wavelength division multiplexed signal lights; and a wavelength demultiplexer configured to wavelength division demultiplex the wavelength division multiplexed signal lights obtained by the wavelength converter, and to output demultiplexed signal lights; wherein the probe light source has: a plurality of sub-probe light sources configured to respectively generate the sub-probe lights with prescribed different wavelengths for respective time-slots; a multiplexer configured to multiplex the sub-probe lights generated by the plurality of sub-probe light sources; and a phase different giving unit configured to give phase differences corresponding to time-slot positions to the sub-probe lights multiplexed by the multiplexer, and to sequentially output the sub-probe lights with the phase differences in correspondence to respective time-slots, such that a sub-probe light with a desired wavelength is outputted in correspondence to a desired time-slot according to the routing control signals.

Other features and advantages of the present invention will become apparent from the following description taken in conjunction with the accompanying drawings.

BRIEF DESCRIPTION OF THE DRAWINGS

FIG. 5A is a diagram showing input and output signal light waveforms for a wavelength converter and a wavelength demultiplexer in the case of using the device shown in FIG. 1 as a signal routing device in a high speed transmission system.

FIG. 5B is a table showing relationship between wavelength of signal lights from ports shown in FIG. 5A and time-slots in the signal routing device of FIG. 1.

FIG. 6 is a block diagram showing one exemplary configuration of a probe light source used in the case of using the device shown in FIG. 1 as a signal routing device.

FIG. 7 is a block diagram showing another exemplary configuration of a probe light source used in the case of using the device shown in FIG. 1 as a signal routing device.

DETAILED DESCRIPTION OF THE PREFERRED EMBODIMENTS

Referring now to FIG. 1 to FIG. 10, one embodiment of a signal demultiplexing device and a signal routing device according to the present invention will be described.

Figure 1:
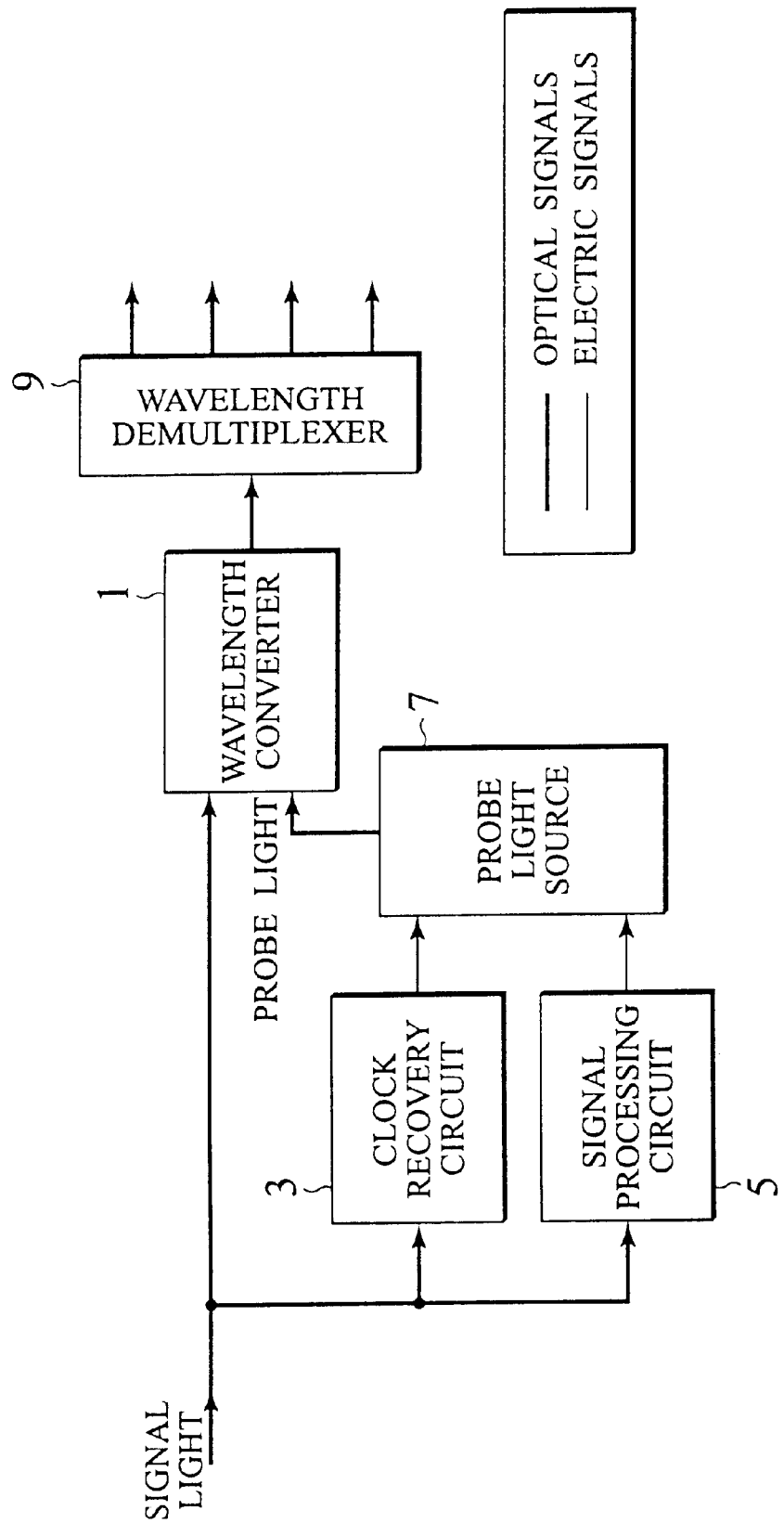
FIG. 1 is a block diagram showing an overall configuration of a signal routing device in a high speed transmission system according to one embodiment of the present invention.

FIG. 1 shows an overall configuration of a signal routing device in a high speed transmission system according to this embodiment. The signal routing device of FIG. 1 takes inputs in forms of high speed multiplexed signal lights in which signal lights with a prescribed identical wavelength are time division multiplexed in terms of time-slots, time division demultiplexes these high speed multiplexed signal lights by converting them into low speed wavelength division multiplexed signal lights, and outputs signal lights with desired wavelengths constituting these low speed wavelength division multiplexed signal lights from a plurality of output ports by distributing them into desired time-slots. Here, when a control for not carrying out a routing which distributes the signal lights with desired wavelengths into desired time-slots is incorporated, this device also functions as a signal demultiplexing device for simply time division demultiplexing the high speed multiplexed signal lights by converting them into low speed wavelength division multiplexed signal lights.

This signal routing device has a wavelength converter 1, a clock recovery circuit 3, and a signal processing circuit 5, to which the input signal lights, i.e., the high speed multiplexed signal lights, are supplied. The clock recovery circuit 3 generates clock signals from the entered signal lights, and supplies these clock signals to a probe light source 7. The probe light source 7 outputs probe lights synchronized with the input signal lights according to the clock signals from the clock recovery circuit 3 and routing control signals from the signal processing circuit 5, and supplies these probe lights to the wavelength converter 1. In FIG. 1, bold lines indicate flows of the signal lights while thin lines indicate flows of electric signals.

Note that the routing control signals from the signal processing circuit 5 are necessary only in the case of carrying out the routing processing, and not necessary in the case of operating this device as a signal demultiplexing device. In the following, the signal demultiplexing device will be described first, and the signal routing device will be described later.

Figure 2:
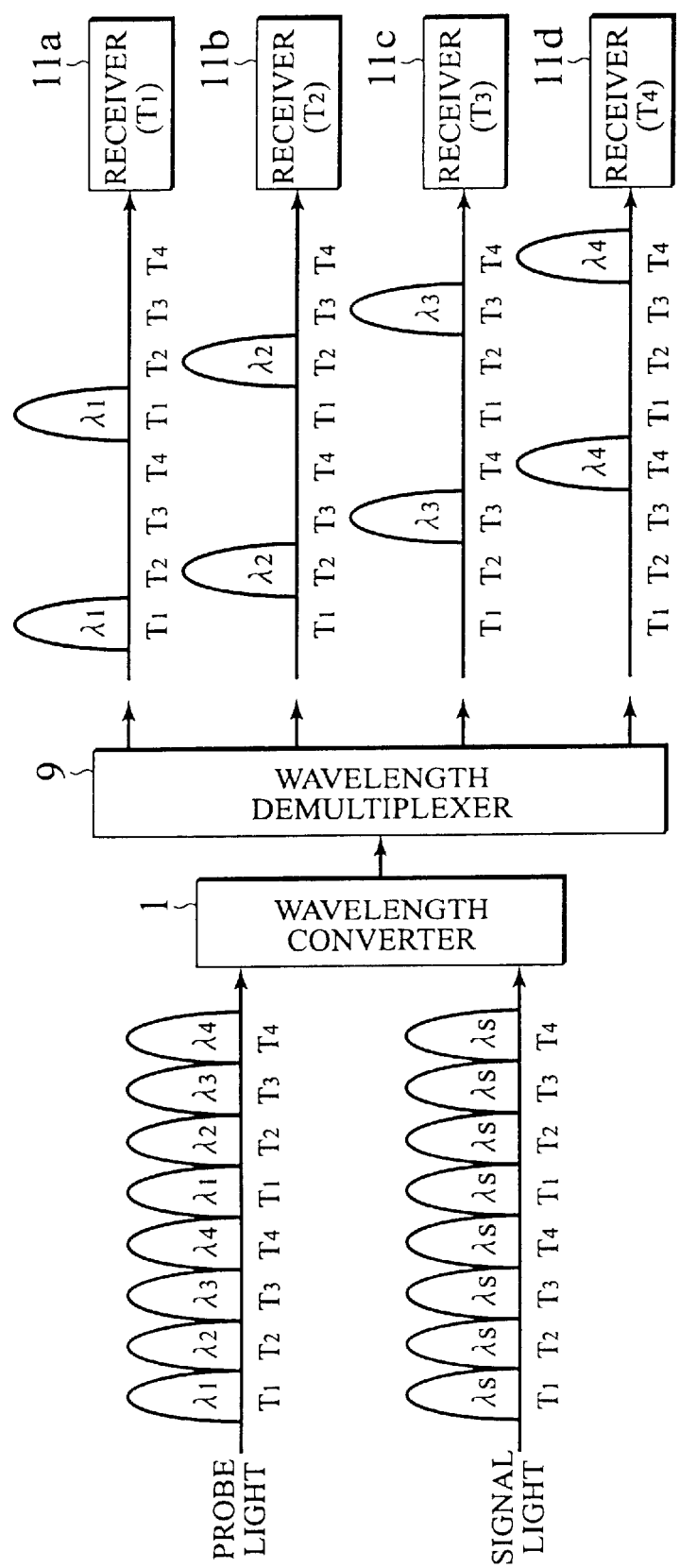
FIG. 2 is a diagram showing input and output signal light waveforms for a wavelength converter and a wavelength demultiplexer in the case of using the device shown in FIG. 1 as a signal demultiplexing device in a high speed transmission system.

As shown in FIG. 2, the probe lights outputted from the probe light source 7 are the low speed wavelength division multiplexed signal lights comprising a series of sub-probe lights with prescribed different wavelengths $\lambda 1, \lambda 2, \lambda 3$ and $\lambda 4$ for respective time-slots T1, T2, T3 and T4 that are synchronized with the signal lights, and the signal lights are the high speed multiplexed signal lights in which the signal lights with a prescribed identical wavelength $\lambda s$ are time division multiplexed in terms of time-slots T1, T2, T3 and T4.

As described above, the input signal lights and the probe lights from the probe light source 7 are entered into the wavelength converter 1. The wavelength converter 1 converts the prescribed wavelength $\lambda s$ of each signal light in each time-slot into a prescribed wavelength $\lambda i$ (i=1, 2, 3, 4) of the probe light in the corresponding time-slot Ti (i=1, 2, 3, 4), and supplies resulting wavelength division multiplexed signal lights to a wavelength demultiplexer 9.

Then, at the wavelength demultiplexer 9, the wavelength division multiplexed signals light from the wavelength converter 1 are demultiplexed, and as outputs of the wavelength demultiplexer 9 shown in FIG. 2, a signal light with a wavelength $\lambda 1$ is outputted to the time-slot T1 from a first port of the wavelength demultiplexer 9, a signal light with a wavelength $\lambda 2$ is outputted to the time-slot T2 from a second port of the wavelength demultiplexer 9, a signal light with a wavelength $\lambda 3$ is outputted to the time-slot T3 from a third port of the wavelength demultiplexer 9, and a signal light with a wavelength $\lambda 4$ is outputted to the time-slot T4 from a fourth port of the wavelength demultiplexer 9.

Figure 12:
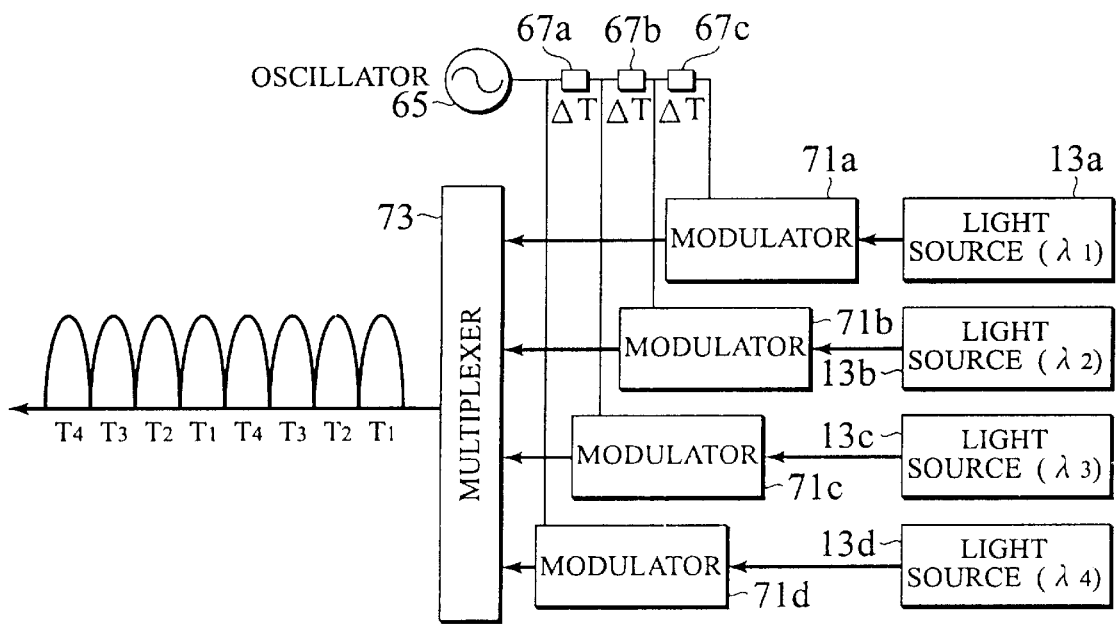
FIG. 12 is a block diagram showing a circuit configuration of a conventional probe light source for realizing an individual modulation scheme using electrically generated phase differences.
Figure 13:
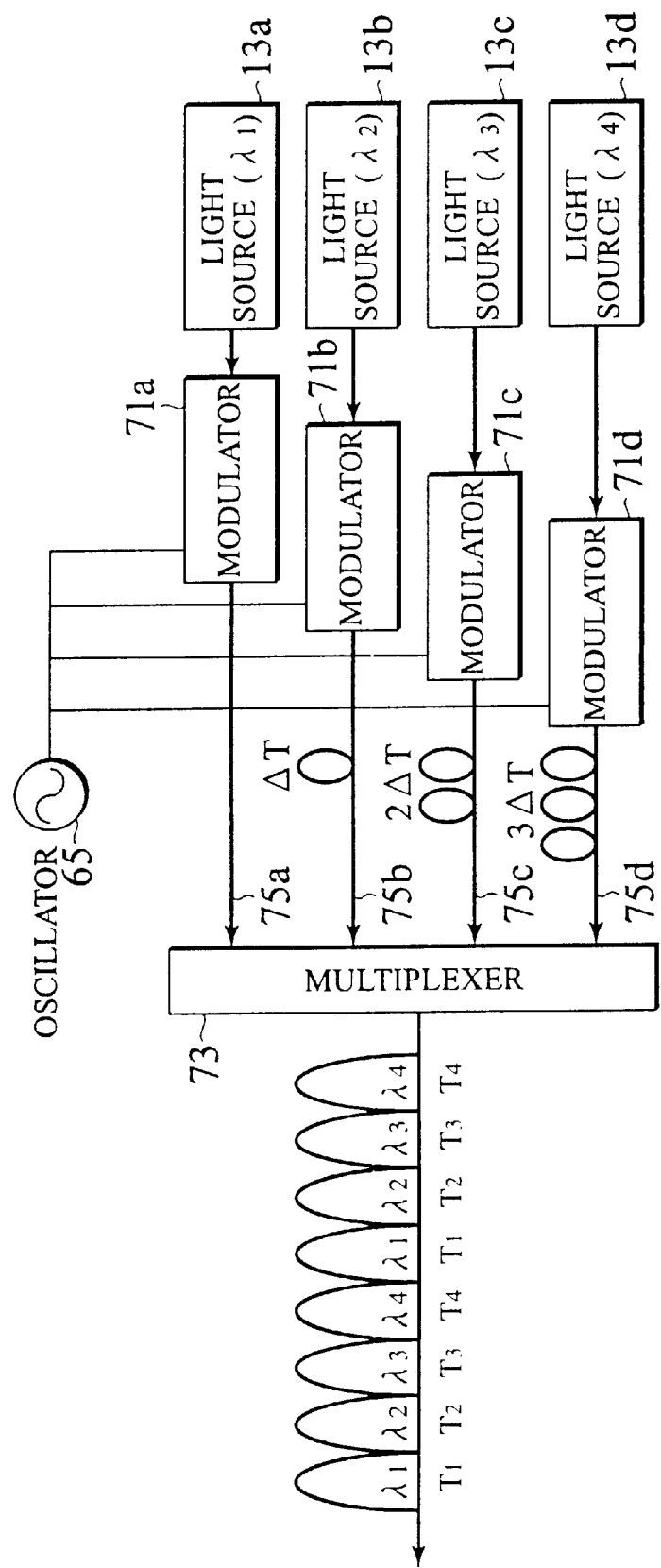
FIG. 13 is a block diagram showing a circuit configuration of a conventional probe light source for realizing an individual modulation scheme using optically generated phase differences.
Figure 14:
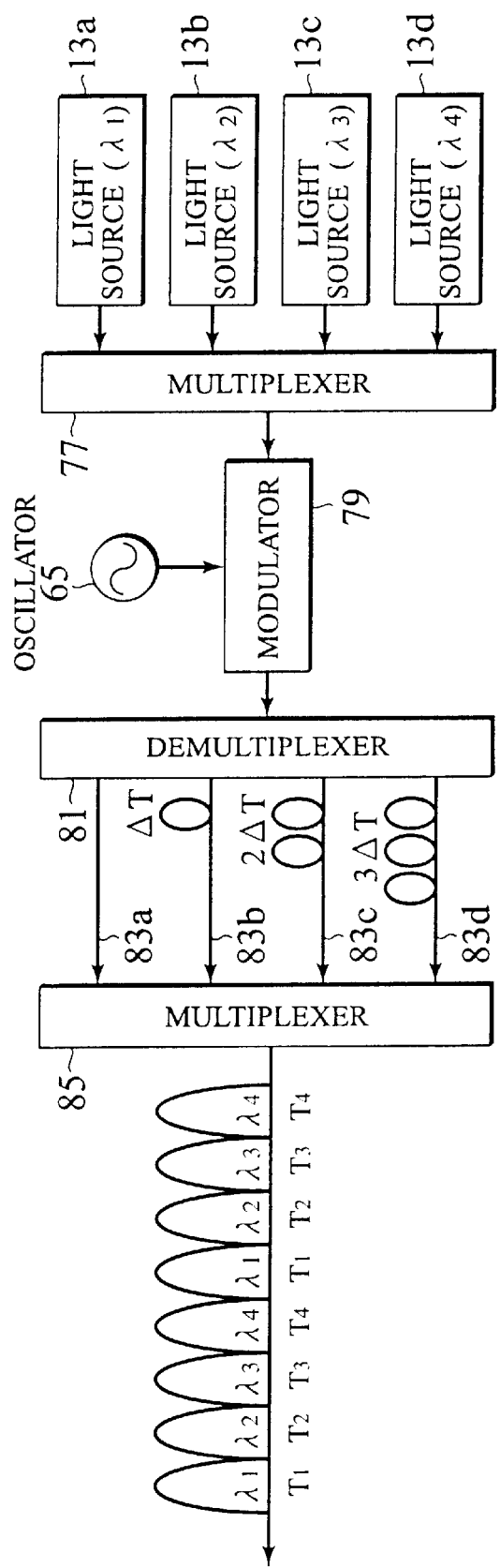
FIG. 14 is a block diagram showing a circuit configuration of a conventional probe light source for realizing a collective modulation scheme.

In the signal demultiplexing device that is operated as described above, as already described with references to FIG. 12 to FIG. 14, the probe light sources for generating the probe lights has conventionally been associated with problems that there is a need to adjust a phase with respect to the respective time-slot individually, and that a circuit configuration is relative large. In this regard, these problems are resolved in the probe light source shown in FIG. 3 or FIG. 4A that is used in this embodiment, which has a relatively simple circuit configuration and is capable of minimizing a phase adjustment function.

Figure 3:
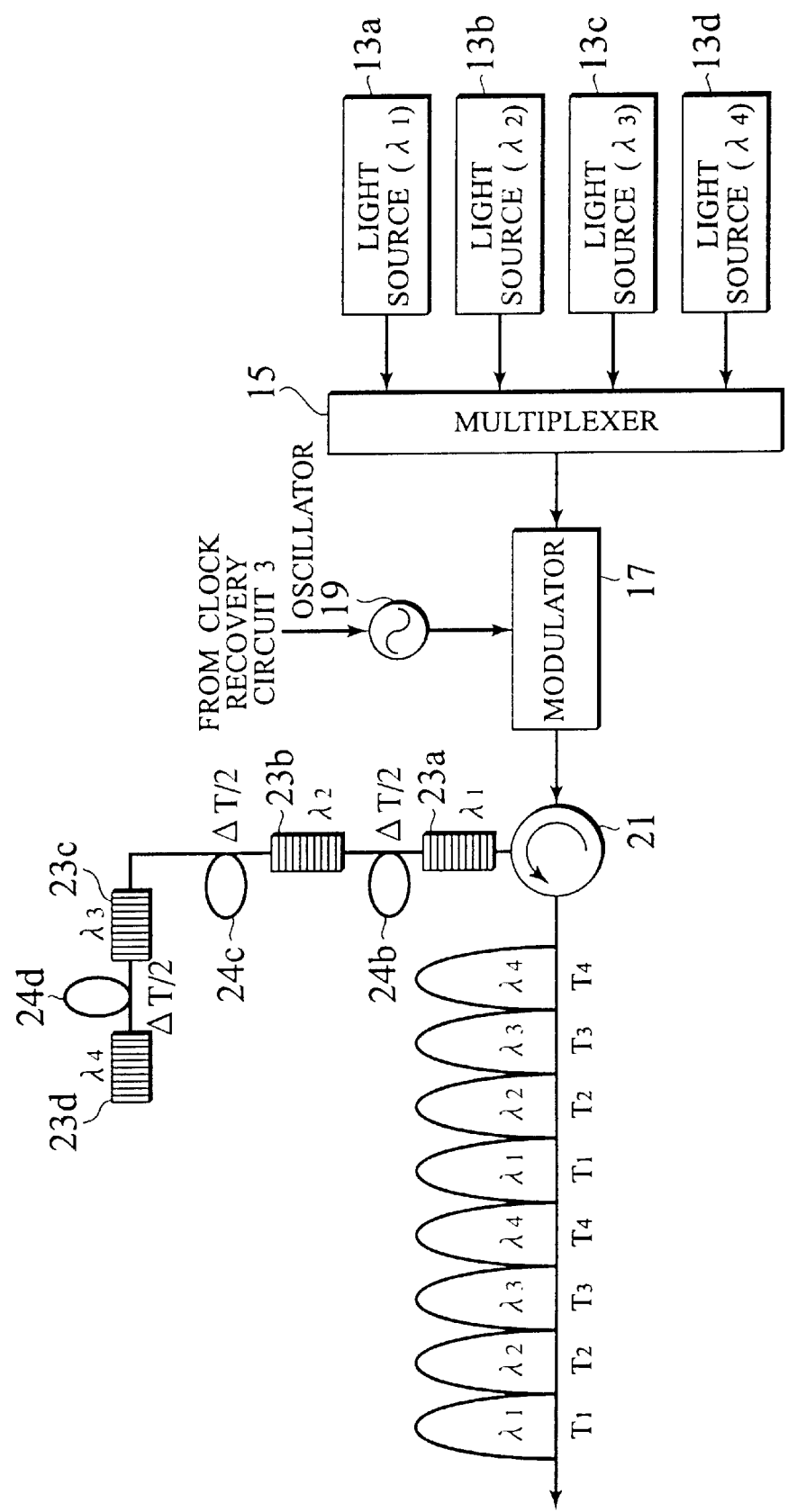
FIG. 3 is a block diagram showing one exemplary configuration of a probe light source used in the case of using the device shown in FIG. 1 as a signal demultiplexing device.

First, the probe light source shown in FIG. 3 will be described. This probe light source of FIG. 3 has a plurality of sub-probe light sources 13a, 13b, 13c and 13d for respectively generating sub-probe lights with prescribed different wavelengths $\lambda1$, $\lambda2$, $\lambda3$ and $\lambda4$ for respective time-slots T1, T2, T3 and T4, and the sub-probe lights outputted from these sub-probe light sources 13a, 13b, 13c and 13d are multiplexed at a multiplexer 15, collectively modulated at a modulator 17 by using signals from an oscillator 19, and supplied to a circulator 21. Note that the clock signals from the clock recovery circuit 3 shown in FIG. 1 are supplied to the oscillator 19 such that the oscillator 19 outputs signals synchronized with the clock signals.

The circulator 21 supplied the plurality of multiplexed sub-probe lights from the modulator 17 to a phase difference giving unit formed by fiber gratings 23a, 23b, 23c and 23d and $\Delta T/2$ delaying optical fibers 24b, 24c and 24d. The sequentially reflected plurality of sub-probe lights that are demultiplexed by receiving the phase differences given by the phase difference giving unit are outputted as the probe lights comprising a series of sub-probe lights with different wavelengths $\lambda1$, $\lambda2$, $\lambda3$ and $\lambda4$ for respective time-slots T1, T2, T3 and T4, as output waveforms of the circulator 21 shown in FIG. 3.

Among the phase difference giving elements in forms of the fiber gratings 23a, 23b, 23c and 23d and the $\Delta T/2$ delaying optical fibers 24b, 24c and 24d, the first fiber grating 23a reflects only the sub-probe light with the first wavelength $\lambda1$ among the plurality of sub-probe lights supplied from the circulator 21, and passes the sub-probe lights with the other wavelengths. Note that the sub-probe light with the first wavelength $\lambda1$ that is reflected by the first fiber grating 23a is returned to the circulator 21, outputted in the time-slot T1 and supplied to the wavelength converter 1.

The sub-probe lights with the other wavelengths that passed through the first fiber grating 23a, i.e., the sub-probe lights with the wavelengths $\lambda2$, $\lambda3$ and $\lambda4$, are delayed by the first $\Delta T/2$ delaying optical fiber 24b for $\Delta T/2$ that is a half of the phase difference between adjacent time-slots, and then reach to the second fiber grating 23b. The second fiber grating 23b reflects only the sub-probe light with the second wavelength $\lambda2$, and passes the sub-probe lights with the other wavelengths. Note that the sub-probe light with the second wavelength $\lambda2$ that is reflected by the second fiber grating 23b is delayed by the first $\Delta T/2$ delaying optical fiber 24b for $\Delta T/2$ again so that it is delayed for exactly one time-slot time altogether, returned to the circulator 21, and outputted in the time-slot T2.

The sub-probe lights with the other wavelengths that passed through the second fiber grating 23b, i.e., the sub-probe lights with the wavelengths $\lambda3$ and $\lambda4$, are further delayed by the second $\Delta T/2$ delaying optical fiber 24c for $\Delta T/2$, and then reach to the third fiber grating 23c. The third fiber grating 23c reflects only the sub-probe light with the third wavelength $\lambda3$, and passes the sub-probe light with the other wavelength. Note that the sub-probe light with the third wavelength $\lambda3$ that is reflected by the third fiber grating 23c is delayed by the second $\Delta T/2$ delaying optical fiber 24c for $\Delta T/2$ again, passed through the second fiber grating 23b again, and delayed by the first $\Delta T/2$ delaying optical fiber 24b for $\Delta T/2$ again so that it is delayed for exactly two time-slot time altogether, returned to the circulator 21, and outputted in the time-slot T3.

The sub-probe light with the other wavelength that passed through the third fiber grating 23c, i.e., the sub-probe light with the wavelength $\lambda4$, is further delayed by the third $\Delta T/2$ delaying optical fiber 24d for $\Delta T/2$, and then reach to the fourth fiber grating 23d. The fourth fiber grating 23d reflects only the sub-probe light with the fourth wavelength $\lambda4$. The sub-probe light with the fourth wavelength $\lambda4$ that is reflected by the fourth fiber grating 23d is delayed by the third $\Delta T/2$ delaying optical fiber 24d for $\Delta T/2$ again, passed through the third fiber grating 23c again, delayed by the second $\Delta T/2$ delaying optical fiber 24c for $\Delta T/2$ again, passed through the second fiber grating 23b again, and delayed by the first $\Delta T/2$ delaying optical fiber 24b for $\Delta T/2$ again so that it is delayed for exactly three time-slot time altogether, returned to the circulator 21, and outputted in the time-slot T4.

A series of sub-probe lights with the wavelengths $\lambda1$, $\lambda2$, $\lambda3$ and $\lambda4$ that are respectively reflected by the first fiber grating 23a, the second fiber grating 23b, the third fiber grating 23c and the fourth fiber grating 23d, and respectively outputted in the time-slots T1, T2, T3 and T4 from the circulator 21 as described above are then supplied to the wavelength converter 1 as the probe lights.

As described above, at the wavelength converter 1, when the probe lights from the probe light source 7 and the signal lights are supplied, the prescribed wavelength $\lambda$s of the signal lights in the time-slots T1, T2, T3 and T4 is converted into prescribed wavelengths $\lambda1$, $\lambda2$, $\lambda3$ and $\lambda4$ of the probe lights in the corresponding time-slots T1, T2, T3 and T4, and resulting wavelength division multiplexed signal lights are supplied to the wavelength demultiplexer 9. Then, at the wavelength demultiplexer 9, the wavelength division multiplexed signal lights from the wavelength converter 1 are demultiplexed, and as shown in FIG. 2, a signal light with a wavelength $\lambda1$ is outputted to the time-slot T1 from the first port, a signal light with a wavelength $\lambda2$ is outputted to the time-slot T2 from the second port, a signal light with a wavelength $\lambda3$ is outputted to the time-slot T3 from the third port, and a signal light with a wavelength $\lambda4$ is outputted to the time-slot T4 from the fourth port.

Next, the probe light source shown in FIG. 4A will be described. Similarly as the probe light source of FIG. 3, this probe light source of FIG. 4A has a plurality of sub-probe light sources 13a, 13b, 13c and 13d for respectively generating sub-probe lights with prescribed different wavelengths $\lambda1$, $\lambda2$, $\lambda3$ and $\lambda4$ for respective time-slots T1, T2, T3 and T4, and the sub-probe lights outputted from these sub-probe light sources 13a, 13b, 13c and 13d are multiplexed at a multiplexer 15 and supplied to a first wavelength dependent modulator 25a and a second wavelength dependent modulator 25b that constitute the phase difference giving unit. Also, the first wavelength dependent modulator 25a and the second wavelength dependent modulator 25b are supplied with modulation signals from a modulation signal generation unit formed by an oscillator 27 and a frequency doubling circuit 29 for doubling the frequency of the oscillator 27 in order to reduce the wavelength to a half.

Figures 4A, 4B, 4C:
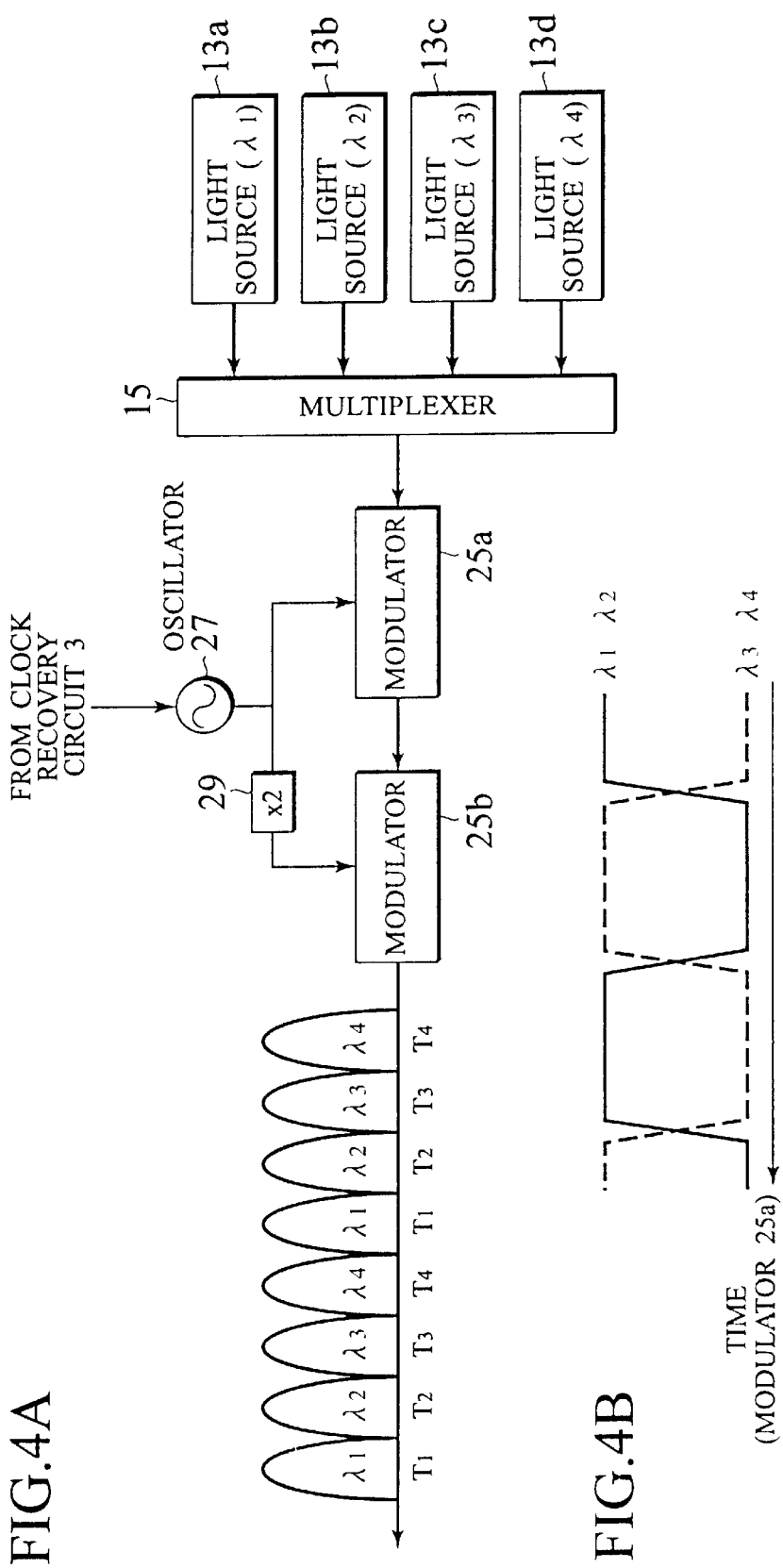
FIG. 4A is a block diagram showing another exemplary configuration of a probe light source used in the case of using the device shown in FIG. 1 as a signal demultiplexing device.
FIGS. 4B and 4C are diagrams respectively showing exemplary forms of modulation signals to be supplied to first and second wavelength dependent modulators used in the probe light source of FIG. 4A.

The oscillator 27 outputs a first modulation signal in a sinusoidal waveform as indicated by a solid line in FIG. 4B, and this first modulation signal is supplied to the first wavelength dependent modulator 25a. Also, the first modulation signal from the oscillator 27 is supplied to the frequency doubling circuit 29 where its frequency is doubled to convert it into a second modulation signal in a sinusoidal waveform as indicated by a solid line in FIG. 4C, and this second modulation signal is supplied to the second wavelength dependent modulator 25b.

The first wavelength dependent modulator 25a modulates the sub-probe lights with the wavelengths $\lambda 1$ and $\lambda 2$ among the plurality of sub-probe lights, i.e., the sub-probe lights with the wavelengths $\lambda 1$, $\lambda 2$, $\lambda 3$ and $\lambda 4$, in a first half period (a period in which the signal is high in FIG. 4B) of the first modulation signal from the oscillator 27, while also modulating the sub-probe lights with the wavelengths $\lambda 3$ and $\lambda 4$ in a second half period (a period in which the signal is low in FIG. 4B) of the first modulation signal. Also, the second wavelength dependent modulator 25b modulates the sub-probe lights with the wavelengths $\lambda 1$ and $\lambda 3$ among the sub-probe lights modulated by the first wavelength dependent modulator 25a in a first half period (a period in which the signal is high in FIG. 4C) of the second modulation signal and outputs them, while also modulating the sub-probe lights with the wavelengths $\lambda 2$ and $\lambda 4$ in a second half period (a period in which the signal is low in FIG. 4C) of the second modulation signal and outputting them.

As a result of modulating the plurality of sub-probe lights at the first wavelength dependent modulator 25a and the second wavelength dependent modulator 25b in this way, a series of sub-probe lights with the wavelengths $\lambda 1$, $\lambda 2$, $\lambda 3$ and $\lambda 4$ corresponding to the respective time-slots T1, T2, T3 and T4 are outputted as the probe lights in waveforms shown in FIG. 4A, and supplied to the wavelength converter 1 shown in FIG. 1.

At the wavelength converter 1, when the probe lights from the probe light source 7 and the signal lights are supplied, the prescribed wavelength $\lambda s$ of the signal lights in the time-slots T1, T2, T3 and T4 is converted into prescribed wavelengths $\lambda 1$, $\lambda 2$, $\lambda 3$ and $\lambda 4$ of the probe lights in the corresponding time-slots T1, T2, T3 and T4, and resulting wavelength division multiplexed signal lights are supplied to the wavelength demultiplexer 9.

Then, at the wavelength demultiplexer 9, the wavelength division multiplexed signal lights from the wavelength converter 1 are demultiplexed, and as shown in FIG. 2, a signal light with a wavelength $\lambda 1$ is outputted to the time-slot T1 from the first port, a signal light with a wavelength $\lambda 2$ is outputted to the time-slot T2 from the second port, a signal light with a wavelength $\lambda 3$ is outputted to the time-slot T3 from the third port, and a signal light with a wavelength $\lambda 4$ is outputted to the time-slot T4 from the fourth port.

Next, with references to FIG. 1 and FIG. 5A to FIG. 10, the signal routing device in the high speed transmission system will be described.

As described above, the device in the high speed transmission system shown in FIG. 1 becomes the signal routing device when the routing control signals are supplied from the signal processing circuit 5 to the probe light source 7, and as a result, the probe light source 7 becomes capable of selectively outputting the sub-probe lights with the desired wavelengths to the desired time-slots according to the routing control signals from the signal processing circuit 5, such that the signal routing device becomes capable of outputting the signal lights with the desired wavelengths from the respective ports by distributing them selectively to the desired time-slots according to the routing control signals.

More specifically, the probe light source 7 is capable of outputting the sub-probe lights with the desired wavelengths $\lambda i$, $\lambda j$, $\lambda k$ and $\lambda l$ (i, j, k, l=1, 2, 3, 4) at the respective time-slots T1, T2, T3 and T4 according to the routing control signals supplied from the signal processing circuit 5, as the probe lights shown in FIG. 5A. Then, at the wavelength converter 1, when the probe lights and the signal lights are supplied, the prescribed wavelength $\lambda s$ of the signal lights in the respective time-slots is converted into desired wavelengths $\lambda i$, $\lambda j$, $\lambda k$ and $\lambda l$ (i, j, k, l=1, 2, 3, 4), and resulting wavelength division multiplexed signal lights are supplied to the wavelength demultiplexer 9. The wavelength demultiplexer 9 can output the signal lights with the desired wavelengths outputted from the respective ports by distributing them to the desired time-slots according to the routing control signals from the signal processing circuit 5, as the signal lights outputted from its output ports-1, 2, 3 and 4 shown in FIG. 5A.

Namely, as can be seen more clearly in comparison with the output from the wavelength demultiplexer 9 in the case of the signal demultiplexing device shown in FIG. 2, the signal light with the wavelength $\lambda 1$ from the port-1 is not fixed to the time-slot T1, for example, and it becomes possible to realize the routing in which this signal light is distributed to the time-slot T1, or the time-slot T2, or the time-slot T3. Note that the relationship between the wavelength of the signal lights outputted from the ports shown in FIG. 5A and the time-slots are as indicated in FIG. 5B.

FIG. 6 shows a configuration of the probe light source which is capable of outputting the sub-probe lights with the desired wavelengths $\lambda i$, $\lambda j$, $\lambda k$ and $\lambda l$ (i, j, k, l=1, 2, 3, 4) at the respective time-slots T1, T2, T3 and T4 according to the routing control signals supplied from the signal processing circuit 5, as shown in FIG. 5A. This probe light source of FIG. 6 differs from the probe light source for the signal demultiplexing device shown in FIG. 3 only in that reflection wavelength variable fiber gratings 31a, 31b, 31c and 31d that are capable of varying the reflection wavelengths according to the routing signals from the signal processing circuit 5 are used instead of the fiber gratings 23a, 23b, 23c and 23d, and the rest of the configuration and the operation are the same.

Namely, the probe light source of FIG. 6 has a configuration in which the wavelength of the signal light to the reflected by each of the reflection wavelength variable fiber gratings 31a, 31b, 31c and 31d can be varied to any of $\lambda 1$ to $\lambda 4$ according to the routing control signals from the signal processing circuit 5.

For example, when the routing control signal for reflecting the wavelength $\lambda 1$ (such a routing control signal will be referred to as a $\lambda 1$ reflection routing control signal hereafter) is supplied to the first reflection wavelength variable fiber grating 31a, the first reflection wavelength variable fiber grating 31a reflects only the sub-probe light with the wavelength $\lambda 1$ among the plurality of sub-probe lights with the wavelengths $\lambda 1$, $\lambda 2$, $\lambda 3$ and $\lambda 4$ from the circulator 21 such that this sub-probe light with the wavelength $\lambda 1$ will be outputted in the time-slot T1 from the circulator 21, but when the $\lambda 4$ reflection routing control signal is supplied, the first reflection wavelength variable fiber grating 31a reflects only the sub-probe light with the wavelength $\lambda 4$ such that this sub-probe light with the wavelength $\lambda 4$ will be outputted in the time-slot T1 from the circulator 21.

Similarly, when the $\lambda 2$ reflection routing control signal is supplied to the second reflection wavelength variable fiber grating 31b, the second reflection wavelength variable fiber grating 31b reflects only the sub-probe light with the wavelength $\lambda 2$ among the plurality of sub-probe lights that are delayed by the first $\Delta T/2$ delaying optical fiber 24b such that this sub-probe light with the wavelength $\lambda 2$ will be delayed by the first $\Delta T/2$ delaying optical fiber 24b again and outputted in the time-slot T2 from the circulator 21, but when the $\lambda 3$ reflection routing control signal is supplied, the second reflection wavelength variable fiber grating 31b reflects only the sub-probe light with the wavelength $\lambda 3$ among the plurality of sub-probe lights that are delayed by the first $\Delta T/2$ delaying optical fiber 24b such that this sub-probe light with the wavelength $\lambda 3$ will be delayed by the first $\Delta T/2$ delaying optical fiber 24b again and outputted in the time-slot T2 from the circulator 21.

Similarly, when the $\lambda 3$ reflection routing control signal is supplied to the third reflection wavelength variable fiber grating 31c, the third reflection wavelength variable fiber grating 31c reflects only the sub-probe light with the wavelength $\lambda 3$ among the plurality of sub-probe lights that are delayed by the first $\Delta T/2$ delaying optical fiber 24b and the second $\Delta T/2$ delaying optical fiber 24c such that this sub-probe light with the wavelength $\lambda 3$ will be delayed by the first $\Delta T/2$ delaying optical fiber 24b and the second $\Delta T/2$ delaying optical fiber 24c again and outputted in the time-slot T3 from the circulator 21, but when the $\lambda 1$ reflection routing control signal is supplied, the third reflection wavelength variable fiber grating 31c reflects only the sub-probe light with the wavelength $\lambda 1$ among the plurality of sub-probe lights that are delayed by the first $\Delta T/2$ delaying optical fiber 24b and the second $\Delta T/2$ delaying optical fiber 24c such that this sub-probe light with the wavelength $\lambda 1$ will be delayed by the first $\Delta T/2$ delaying optical fiber 24b and the second $\Delta T/2$ delaying optical fiber 24c again and outputted in the time-slot T3 from the circulator 21.

Similarly, when the $\lambda 4$ reflection routing control signal is supplied to the fourth reflection wavelength variable fiber grating 31d, the fourth reflection wavelength variable fiber grating 31d reflects only the sub-probe light with the wavelength $\lambda 4$ among the sub-probe lights that are delayed by the first $\Delta T/2$ delaying optical fiber 24b, the second $\Delta T/2$ delaying optical fiber 24c and the third $\Delta T/2$ delaying optical fiber 24d such that this sub-probe light with the wavelength $\lambda 4$ will be delayed by the first $\Delta T/2$ delaying optical fiber 24b, the second $\Delta T/2$ delaying optical fiber 24c and the third $\Delta T/2$ delaying optical fiber 24d again and outputted in the time-slot T4 from the circulator 21, but when the $\lambda 2$ reflection routing control signal is supplied, the fourth reflection wavelength variable fiber grating 31d reflects only the sub-probe light with the wavelength $\lambda 2$ among the sub-probe lights that are delayed by the first $\Delta T/2$ delaying optical fiber 24b, the second $\Delta T/2$ delaying optical fiber 24c and the third $\Delta T/2$ delaying optical fiber 24d such that this sub-probe light with the wavelength $\lambda 2$ will be delayed by the first $\Delta T/2$ delaying optical fiber 24b, the second $\Delta T/2$ delaying optical fiber 24c and the third $\Delta T/2$ delaying optical fiber 24d again and outputted in the time-slot T4 from the circulator 21.

By such an operation, the plurality of sub-probe lights constituting the probe lights outputted from the probe light source can be outputted as the sub-probe lights with the desired wavelengths $\lambda i, \lambda j, \lambda k$ and $\lambda l$ (i, j, k, l=1, 2, 3, 4) at the respective time-slots T1, T2, T3 and T4 according to the routing control signals from the signal processing circuit 5, as shown in FIG. 5A. Namely, the probe light source can output the sub-probe light with any wavelength $\lambda i$ (i=1, 2, 3, 4) among the wavelengths $\lambda 1, \lambda 2, \lambda 3$ and $\lambda 4$ at the time-slot T1, the sub-probe light with any wavelength $\lambda j$ (j=1, 2, 3, 4) at the time-slot T2, the sub-probe light with any wavelength $\lambda k$ (k=1, 2, 3, 4) at the time-slot T3, and the sub-probe light with any wavelength $\lambda l$ (l=1, 2, 3, 4) at the time-slot T4, according to the routing control signals.

Then, at the wavelength converter 1, when the probe lights and the signal lights are supplied, the prescribed wavelength $\lambda s$ of the signal lights in the respective time-slots is converted into desired wavelengths $\lambda i, \lambda j, \lambda k$ and $\lambda l$ (i, j, k, l=1, 2, 3, 4) in the corresponding time-slots Ti (i=1, 2, 3, 4), and resulting wavelength division multiplexed signal lights are supplied to the wavelength demultiplexer 9. The wavelength demultiplexer 9 can output the signal lights with the desired wavelengths $\lambda i, \lambda j, \lambda k$ and $\lambda l$ (i, j, k, l=1, 2, 3, 4) outputted from its output ports-1, 2, 3 and 4 by distributing them to the desired time-slots Ti (i=1, 2, 3, 4) according to the routing control signals from the signal processing circuit 5.

Next, with reference to FIG. 7, another probe light source that is capable of outputting the sub-probe lights with arbitrary wavelengths at the respective time-slots according to the routing control signals similarly as described above will be described.

This probe light source of FIG. 7 differs from the probe light source for the signal demultiplexing device shown in FIG. 4A only in that a first phase shifter 35a and a second phase shifter 35b are provided at the input side of the first wavelength dependent modulator 25a and the second wavelength dependent modulator 25b respectively, and the rest of the configuration and the operation are the same.

The first and second phase shifters 35a and 35b respectively shift phases of the modulation signals inputted into the first and second wavelength dependent modulators 25a and 25b by 180° according to the routing control signals from the signal processing circuit 5, so as to variably control the phases of the modulation signals according to the routing control signals such that the sub-probe lights with the desired wavelengths $\lambda j$ (j=1, 2, 3, 4) can be outputted at the desired time-slots Ti (i=1, 2, 3, 4) from the second wavelength dependent modulator 25b which is the last stage wavelength dependent modulator.

Figure 8A:
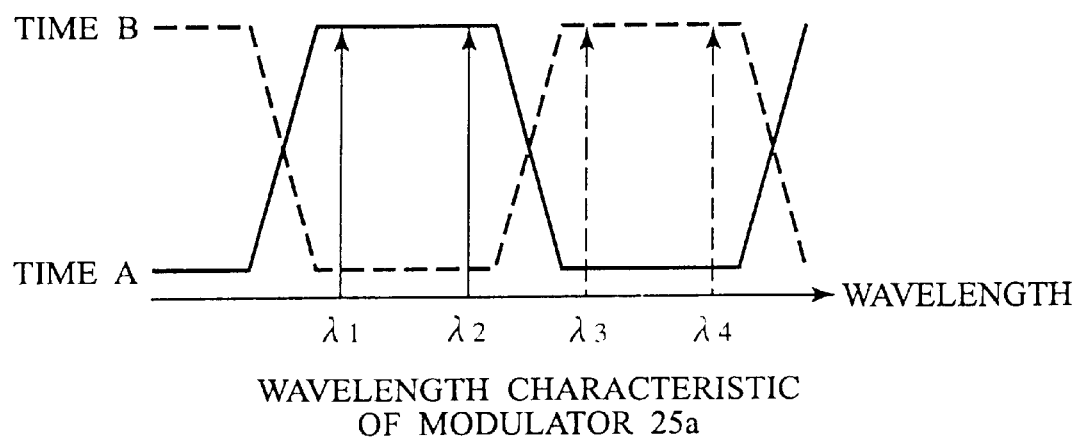
FIGS. 8A and 8B are diagrams respectively showing wavelength characteristics of first and second wavelength dependent modulators used in the probe light source of FIG. 7.

The first modulation signal supplied from the oscillator 27 through the first phase shifter 35a to the first wavelength dependent modulator 25a is nearly rectangular signal as indicated by a solid line in FIG. 8A, and the first wavelength dependent modulator 25a modulates the sub-probe lights with the wavelengths $\lambda 1$ and $\lambda 2$ in a first half period (a period in which the signal is high in FIG. 8A) of the first modulation signal indicated by the solid line, while also modulating the sub-probe lights with the wavelengths $\lambda 3$ and $\lambda 4$ in a second half period (a period in which the signal is low in FIG. 8A) of the first modulation signal. Here, the phase of the first modulation signal is shifted by 180° according to the routing control signal from the signal processing circuit 5.

When the phase of the first modulation signal indicated by the solid line is shifted by 180° according to the routing control signal, the first modulation signal indicated by the solid line in FIG. 8A will be shifted to a state as indicated by a dashed line, so that the first modulation signal becomes low at a timing where the sub-probe lights with $\lambda 1$ and $\lambda 2$ have been modulated before and therefore the sub-probe lights with $\lambda 3$ and $\lambda 4$ will be modulated at this timing, whereas the first modulation signal becomes high at a timing where the sub-probe lights with $\lambda 3$ and $\lambda 4$ have been modulated before and therefore the sub-probe lights with $\lambda 1$ and $\lambda 2$ will be modulated at this timing.

Figure 8B:
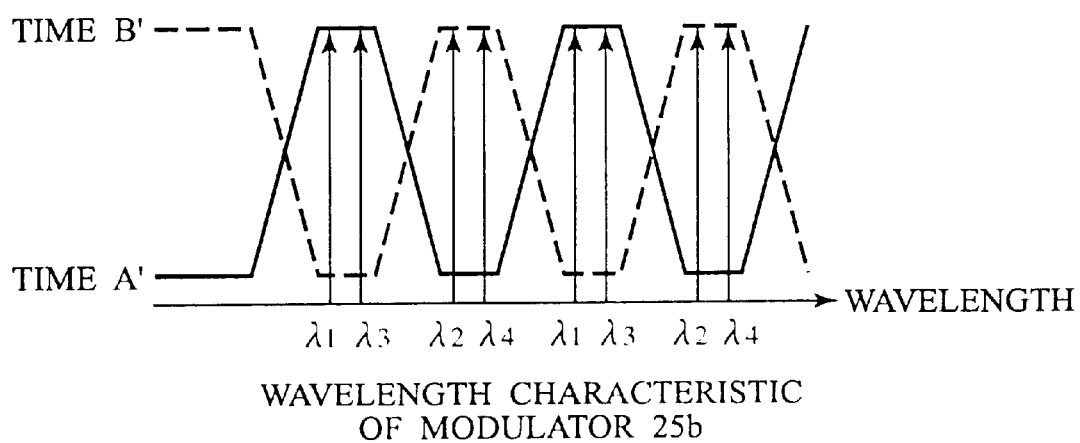

On the other hand, the second modulation signal supplied from the oscillator 27 through the frequency doubling circuit 29 and the second phase shifter 35a to the second wavelength dependent modulator 25b is also nearly rectangular signal as indicated by a solid line in FIG. 8B, but its period is a half of that of the first modulation signal shown in FIG. 8A, and the second wavelength dependent modulator 25b modulates the sub-probe lights with the wavelengths λ1 and λ3 in a first half period (a period in which the signal is high in FIG. 8B) of the second modulation signal, while also modulating the sub-probe lights with the wavelengths λ2 and λ4 in a second half period (a period in which the signal is low in FIG. 8B) of the second modulation signal. Here, the phase of the second modulation signal is shifted by 180° according to the routing control signal from the signal processing circuit 5.

When the phase of the second modulation signal is shifted by 180° according to the routing control signal, the second modulation signal indicated by the solid line in FIG. 8B will be shifted to a state as indicated by a dashed line, so that the second modulation signal becomes low at a timing where the sub-probe lights with λ1 and λ3 have been modulated before and therefore the sub-probe lights with λ2 and λ4 will be modulated at this timing, whereas the second modulation signal becomes high at a timing where the sub-probe lights with λ2 and λ4 have been modulated before and therefore the sub-probe lights with λ1 and λ3 will be modulated at this timing.

Figure 9A:
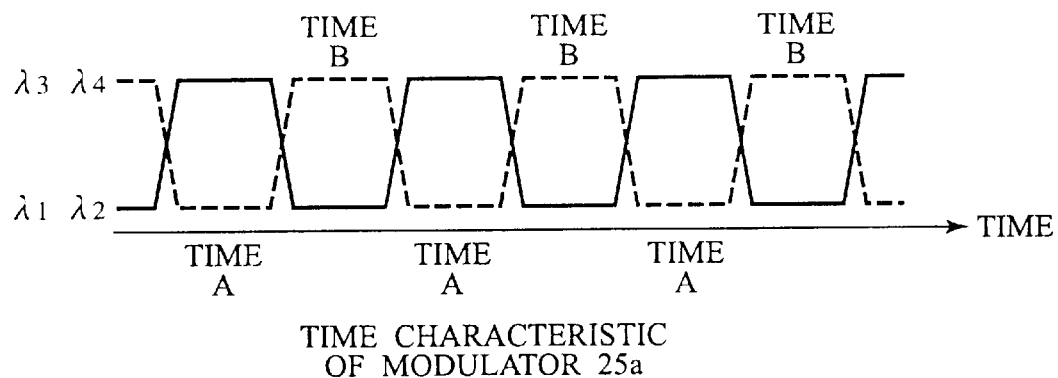
FIGS. 9A and 9B are diagrams respectively showing time characteristics of first and second wavelength dependent modulators used in the probe light source of FIG. 7.
Figure 9B:
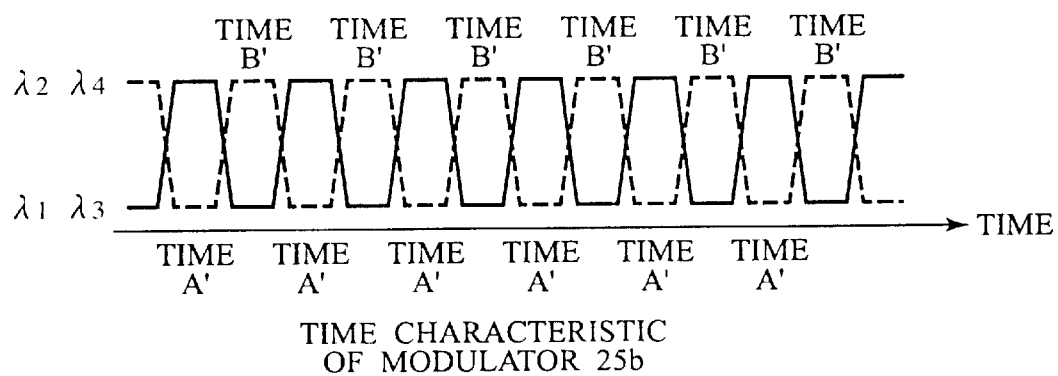

As described, times at which the first modulation signal is high, that is times for modulating the sub-probe lights with λ1 and λ2 as indicated in FIG. 8A can be defined as times A as shown in FIG. 9A, while times at which the first modulation signal is low, that is times for modulating the sub-probe lights with λ3 and λ4 as indicated in FIG. 8A can be defined as times B as shown in FIG. 9A. Also, times at which the second modulation signal is high, that is times for modulating the sub-probe lights with λ1 and λ3 as indicated in FIG. 8B can be defined as times A' as shown in FIG. 9B, while times at which the second modulation signal is low, that is times for modulating the sub-probe lights with λ2 and λ4 as indicated in FIG. 8B can be defined as times B' as shown in FIG. 9B.

Now, with reference to FIG. 10, the operation principle of the first and second wavelength dependent modulators 25a and 25b will be described.

Figure 10:
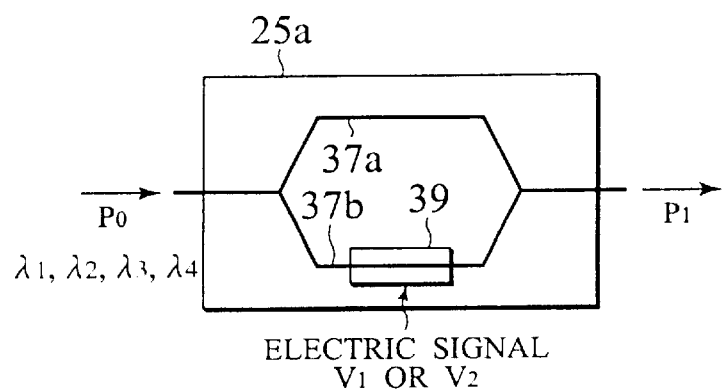
FIG. 10 is a diagram showing an exemplary configuration of a first wavelength dependent modulator used in the probe light source of FIG. 7.
Figure 11:
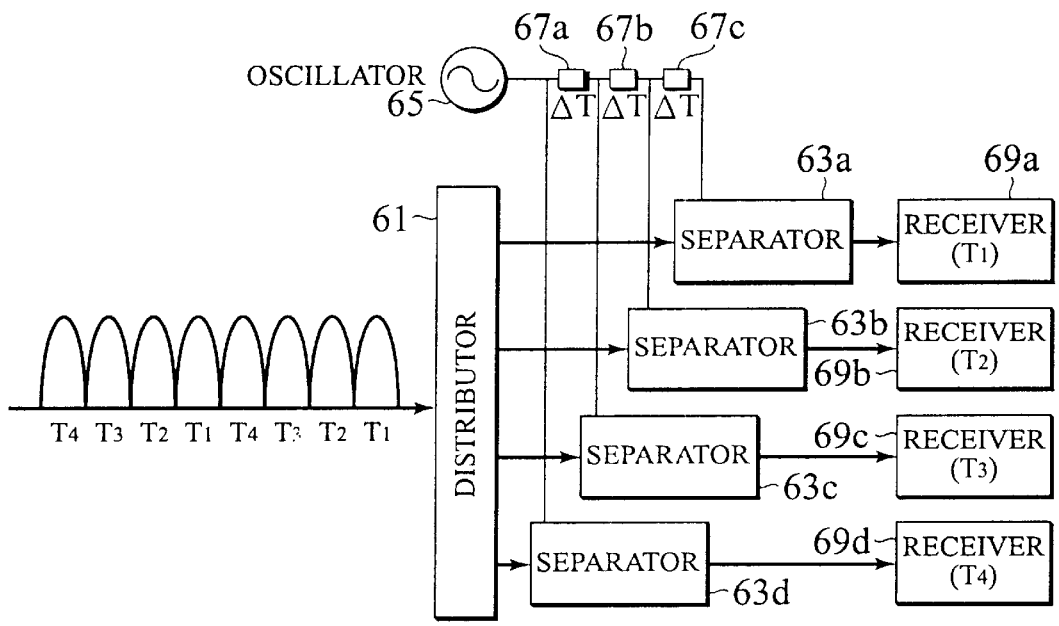
FIG. 11 is a block diagram showing a configuration of a conventional signal demultiplexing device.

FIG. 10 shows a configuration of the first wavelength dependent modulator 25a as an example. The first wavelength dependent modulator 25a has two waveguides 37a and 37b that are branching from an input port P0 in which the sub-probe lights with the wavelengths λ1, λ2, λ3 and λ4 are entered, and these two branched waveguides 37a and 37b are re-coupled and connected to an output port P1. Then, an electrode 39 is provided in a vicinity of one waveguide 37b, and a prescribed electric signal V1 or V2 corresponding to the routing control signal is applied to this electrode 39 through the first and second phase shifters 35a and 35b such that the first wavelength dependent modulator 25a can control the wavelength to be modulated.

More specifically, denoting the voltage applied to the electrode 39 as V, the transmissivity T of the wavelength dependent modulator shown in FIG. 10 is defined by the following equation.

$$T = P0/P1 = \cos^2[\Delta\phi(\lambda, V)/2]$$

Consequently, by appropriately choosing a function $\Delta\phi(\lambda, V)$ in this equation, the following expressions can be obtained.

For the time A, $$\Delta\phi(\lambda 1, V1) = 2m\pi$$
$$\Delta\phi(\lambda 2, V1) = 2m'\pi$$
$$\Delta\phi(\lambda 3, V1) = 2m''\pi$$
$$\Delta\phi(\lambda 4, V1) = 2m'''\pi$$

where m, m', m" and m'" are integers.

For the time B, $$\Delta\phi(\lambda 1, V2) = (2k + 1)\pi$$
$$\Delta\phi(\lambda 2, V2) = (2k' + 1)\pi$$
$$\Delta\phi(\lambda 3, V2) = (2k'' + 1)\pi$$
$$\Delta\phi(\lambda 4, V2) = (2k''' + 1)\pi$$

where k, k', k" and k'" are integers.

From the above calculations, it can be shown that the sub-probe lights that passed through the two waveguides 37a and 37b will be outputted if their phases coincide, and the output becomes zero if their phases do not coincide.

As described above, in the first and second wavelength dependent modulators 25a and 25b, the wavelengths to be modulated are varied according to signals at half period intervals of the respective modulation signals that are outputted from the first and second phase shifters 35a and 35b under the control of the routing control signals from the signal processing circuit 5, as follows.

Namely, in the first wavelength dependent modulator 25a, the sub-probe lights with the wavelengths λ1 and λ2 are modulated at the first half period of the first modulation signal, and the sub-probe lights with the wavelengths λ3 and λ4 are modulated at the second half period of the first modulation signal. Then, when the phase of the first modulation signal is shifted by 180° according to the routing control signal, the sub-probe lights with the wavelengths λ3 and λ4 are modulated at a timing where the sub-probe lights with the wavelengths λ1 and λ2 have been modulated before, and the sub-probe lights with the wavelengths λ1 and λ2 are modulated at a timing where the sub-probe lights with the wavelengths λ3 and λ4 have been modulated before.

Also, in the second wavelength dependent modulator 25b, the sub-probe lights with the wavelengths λ1 and λ3 are modulated at the first half period of the second modulation signal, and the sub-probe lights with the wavelengths λ2 and λ4 are modulated at the second half period of the second modulation signal. Then, when the phase of the second modulation signal is shifted by 180° according to the routing control signal, the sub-probe lights with the wavelengths λ2 and λ4 are modulated at a timing where the sub-probe lights with the wavelengths λ1 and λ3 have been modulated before, and the sub-probe lights with the wavelengths λ1 and λ3 are modulated at a timing where the sub-probe lights with the wavelengths λ2 and λ4 have been modulated before.

As a result, the sub-probe lights with the wavelengths λ1, λ2, λ3 and λ4 are entered into the first wavelength dependent modulator 25a from the multiplexer 15 in FIG. 7, where only the sub-probe lights with the wavelengths λ1 and λ2 are modulated at the first half period of the first modulation signal from the first phase shifter 35a, and then supplied to the second wavelength dependent modulator 25b, where only the sub-probe light with the wavelength λ1 among the sub-probe lights with the wavelengths λ1 and λ2 is modulated at the first half period of the second modulation signal from the second phase shifter 35b, such that the sub-probe light with the wavelength λ1 is outputted at the time-slot T1 as in the output waveform shown in FIG. 7. After that, the sub-probe light with the wavelength λ2 is modulated at the second half period of the second modulation signal such that the sub-probe light with the wavelength λ2 is outputted at the time-slot T2.

Then, only the sub-probe lights with the wavelengths λ3 and λ4 are modulated at the second half period of the first modulation signal and supplied to the second wavelength dependent modulator 25b, where only the sub-probe light with the wavelength λ3 among the sub-probe lights with the wavelengths λ3 and λ4 is modulated at the first half period of the second modulation signal, such that the sub-probe light with the wavelength λ3 is outputted at the time-slot T3. After that, the sub-probe light with the wavelength λ4 is modulated at the second half period of the second modulation signal such that the sub-probe light with the wavelength λ4 is outputted at the time-slot T4.

In this way, the sub-probe lights with the wavelengths λ1, λ2, λ3 and λ4 are sequentially outputted in this order in correspondence to the time-slots T1, T2, T3 and T4.

When the phase of the first modulation signal from the first phase shifter 35a is shifted by 180° according to the routing control signal from the signal processing circuit 5 such that the first modulation signal is in a state indicated by a dashed line in FIG. 8A, in the sub-probe lights with the wavelengths λ1, λ2, λ3 and λ4 entered from the multiplexer 15, only the sub-probe lights with the wavelengths λ3 and λ4 are modulated at the first half period of the first modulation signal, and then only the sub-probe light with the wavelength λ4 among the sub-probe lights with the wavelengths λ3 and λ4 is modulated at the first half period of the second modulation signal, such that the sub-probe light with the wavelength λ4 is outputted at the time-slot T1. After that, the sub-probe light with the wavelength λ3 is modulated at the second half period of the second modulation signal such that the sub-probe light with the wavelength λ3 is outputted at the time-slot T2.

Then, only the sub-probe lights with the wavelengths λ1 and λ2 are modulated at the second half period of the first modulation signal and then only the sub-probe light with the wavelength λ2 among the sub-probe lights with the wavelengths λ1 and λ2 is modulated at the first half period of the second modulation signal, such that the sub-probe light with the wavelength λ2 is outputted at the time-slot T3. After that, the sub-probe light with the wavelength λ1 is modulated at the second half period of the second modulation signal such that the sub-probe light with the wavelength λ1 is outputted at the time-slot T4.

In this way, the sub-probe lights with the wavelengths λ4, λ3, λ2 and λ1 are sequentially outputted in this order in correspondence to the time-slots T1, T2, T3 and T4.

Also, in the case where the sub-probe light with the wavelength λ3 should be outputted at the time-slot T1, the phase of the second modulation signal is also shifted by 180° according to the routing control signal at the same time as the phase of the first modulation signal is shifted by 180° according to the routing control signal from the signal processing circuit 5. As a result, in the sub-probe lights with the wavelengths λ1, λ2, λ3 and λ4 entered from the multiplexer 15, only the sub-probe lights with the wavelengths λ3 and λ4 are modulated at the first half period of the first modulation signal, and then only the sub-probe light with the wavelength λ3 among the sub-probe lights with the wavelengths λ3 and λ4 is modulated at the first half period of the second modulation signal, such that the sub-probe light with the wavelength λ3 is outputted at the time-slot T1.

By controlling the phases of the first and second modulation signals through the first and second phase modulators 35a and 35b according to the routing control signals from the signal processing circuit 5 and supplying the first and second modulation signals to the first and second wavelength dependent modulators 25a and 25b in this way, it becomes possible to output the sub-probe light with arbitrary wavelength among the wavelengths λ1, λ2, λ3 and λ4 at arbitrary time-slot among the time-slots T1, T2, T3 and T4.

As a result, similarly as in the case of the probe light source shown in FIG. 6, at the wavelength converter 1, when the probe lights outputted from the probe light source shown in FIG. 7 and the signal lights are supplied, the prescribed wavelength λs of the signal lights in the respective time-slots is converted into desired wavelengths λi, λj, λk and λl (i, j, k, l=1, 2, 3, 4) of the probe lights in the corresponding time-slots Ti (i=1, 2, 3, 4), and resulting wavelength division multiplexed signal lights are supplied to the wavelength demultiplexer 9. Then, the wavelength demultiplexer 9 can output the signal lights with the desired wavelengths λ1, λ2, λ3 and λ4 outputted from its output ports-1, 2, 3 and 4 by distributing them to the desired time-slots Ti (i=1, 2, 3, 4) according to the routing control signals from the signal processing circuit 5.

As described, according to the present invention, the phase differences corresponding to the respective time-slot positions are given to the plurality of sub-probe lights, and the probe lights comprising a series of sub-probe lights sequentially outputted in the corresponding time-slots and the high speed multiplexed signal lights are received. Then, the prescribed wavelength of the high speed multiplexed signal lights in the respective time-slots is converted into prescribed wavelengths of the probe lights in the corresponding time-slots and resulting wavelength division multiplexed signal lights are outputted by wavelength division demultiplexing them.

Consequently, it becomes possible to handle the high speed multiplexed signal lights for which a processing using electric signals is impossible. Also, it becomes possible to simplify the hardware for the time division demultiplexing of the wavelength division multiplexed signal lights, so that there is an economical advantage and the phase adjustment function can be minimized.

Also, according to the present invention, only the sub-probe light with the first wavelength among the plurality of sub-probe lights is reflected by the first fiber grating, while the sub-probe lights with the other wavelengths that passed the first fiber grating are delayed. Then, the similar plural sets of the delaying element and the fiber grating for reflecting only the sub-probe light of a specific wavelength are connected in series, using the sub-probe lights that passed a set of the delaying element and the fiber grating of the previous stage as the input at each stage. Then, the plurality of sub-probe lights reflected from the fiber gratings are outputted as the probe lights.

Consequently, it is possible to output the probe lights by a relatively simple configuration, so that there is an economical advantage.

Also, according to the present invention, the plurality of modulation signals with wavelengths sequentially reduced to a half of the previous one are generated, and supplied to the plurality of wavelength dependent modulators for modulating the plurality of sub-probe lights by using these modulation signals in such a way that the odd numbered modulation signal including the first modulation signal are sequentially supplied to the corresponding odd numbered wavelength dependent modulators including the first wavelength dependent modulator, and the even numbered modulation signals including the second modulation signal are sequentially supplied to the corresponding even numbered wavelength dependent modulators including the second wavelength dependent modulator.

Then, the first wavelength dependent modulator modulates a first half of the plurality of sub-probe lights at a first half period of the first modulation signal, and modulates a second half of the plurality of sub-probe lights at a second half of the first modulation signal. Also, the second wavelength dependent modulator modulates a half of the first half and a half of the second half of the plurality of sub-probe lights at a first half period of the second modulation signal, and modulates the remaining half of the first half and the remaining half of the second half of the plurality of sub-probe lights at a second half of the second modulation signal, and so on. In this way, the plurality of wavelength dependent modulators are connected in series such that the plurality of sequentially obtained sub-probe lights in which the wavelengths are in correspondence to the time-slots can be outputted from the last stage wavelength dependent modulator.

Consequently, it is possible to output the probe lights by a relatively simple configuration, so that there is an economical advantage. In addition, the phase adjustment can be realized accurately by a simple configuration.

Also, according to the present invention, the phase differences corresponding to the respective time-slot positions are given to the plurality of sub-probe lights such that the sub-probe lights with the desired wavelengths will be outputted at the desired time-slots according to the routing control signals, and the probe lights comprising a series of sub-probe lights sequentially outputted in the corresponding time-slots and the high speed multiplexed signal lights are received. Then, the prescribed wavelength of the high speed multiplexed signal lights in the respective time-slots is converted into desired wavelengths of the probe lights in the corresponding time-slots and resulting wavelength division multiplexed signal lights are outputted by wavelength division demultiplexing them.

Consequently, it becomes possible to handle the high speed multiplexed signal lights for which a processing using electric signals is impossible. Also, it becomes possible to simplify the hardware for the time division demultiplexing of the wavelength division multiplexed signal lights, so that there is an economical advantage and the phase adjustment function can be minimized. In addition, the routing processing for distributing the signal lights with the desired wavelengths into the desired time-slots can be realized easily.

Also, according to the present invention, only the sub-probe light with the desired wavelength according to the routing control signal among the plurality of sub-probe lights is reflected by the first fiber grating, while the sub-probe lights with the other wavelengths that passed the first fiber grating are delayed. Then, the similar plural sets of the delaying element and the fiber grating for reflecting only the sub-probe light of a specific wavelength are connected in series, using the sub-probe lights that passed a set of the delaying element and the fiber grating of the previous stage as the input at each stage. Then, the plurality of sub-probe lights reflected from the fiber gratings are outputted as the probe lights.

Consequently, it is possible to output the probe lights to the desired time-slots according to the routing control signals by a relatively simple configuration, so that there is an economical advantage.

Also, according to the present invention, the plurality of modulation signals with wavelengths sequentially reduced to a half are generated, and supplied to the plurality of wavelength dependent modulators for modulating the plurality of sub-probe lights by using these modulation signals in such a way that the odd numbered modulation signal including the first modulation signal are sequentially supplied to the corresponding odd numbered wavelength dependent modulators including the first wavelength dependent modulator, and the even numbered modulation signals including the second modulation signal are sequentially supplied to the corresponding even numbered wavelength dependent modulators including the second wavelength dependent modulator.

Then, the first wavelength dependent modulator modulates a first half of the plurality of sub-probe lights are modulated at a first half period of the first modulation signal, and modulates a second half of the plurality of sub-probe lights are modulated at a second half of the first modulation signal. Also, the second wavelength dependent modulator modulates a half of the first half and a half of the second half of the plurality of sub-probe lights are modulated at a first half period of the second modulation signal, and modulates the remaining half of the first half and the remaining half of the second half of the plurality of sub-probe lights are modulated at a second half of the second modulation signal, and so on. In this way, the plurality of wavelength dependent modulators are connected in series such that the plurality of sequentially obtained sub-probe lights in which the wavelengths are in correspondence to the time-slots can be outputted from the last stage wavelength dependent modulator, while variably controlling the phases of the plurality of modulation signals according to the routing control signals such that the sub-probe lights with the desired wavelengths can be outputted at the desired time-slots from the last stage wavelength dependent modulator.

Consequently, it is possible to output the probe lights at the desired time-slots according to the routing control signals by a relatively simple configuration, so that there is an economical advantage. In addition, the phase adjustment can be realized accurately by a simple configuration.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A signal demultiplexing device in a high speed transmission system, for time division demultiplexing high speed multiplexed signal lights in which signal lights with a prescribed identical wavelength are time division multiplexed in terms of time-slots, by converting the high speed multiplexed signal lights into low speed wavelength division multiplexed signal lights, the signal demultiplexing device comprising:

a probe light source configured to generate probe lights formed by a series of sub-probe lights with prescribed different wavelengths for respective time-slots, in synchronization with the high speed multiplexed signal lights;

a wavelength converter configured to receive the probe lights from the probe light source and the high speed multiplexed signal lights, and to convert the prescribed identical wavelength of the high speed multiplexed signal lights in each time-slot into a prescribed wavelength of a probe light in a corresponding time-slot so as to obtain wavelength division multiplexed signal lights; and a wavelength demultiplexer configured to wavelength division demultiplex the wavelength division multiplexed signal lights obtained by the wavelength converter, and to output demultiplexed signal lights;

wherein the probe light source has a plurality of sub-probe light sources configured to respectively generate the sub-probe lights with the prescribed different wavelengths for respective time-slots;

a multiplexer configured to multiplex the sub-probe lights generated by the plurality of sub-probe light sources; and a phase different giving unit configured to give phase differences corresponding to time-slot positions to the sub-probe lights multiplexed by the multiplexer, and to sequentially output the sub-probe lights with the phase differences in correspondence to respective time-slots; and the phase difference giving unit comprises:

a modulator for collectively modulating the sub-probe lights multiplexed by the multiplexer;

a first fiber grating for reflecting only a sub-probe light with a first wavelength and passing other sub-probe lights with wavelengths other than the first wavelength among the sub-probe lights modulated by the modulator;

a plurality of grating/delay pairs connected in series to which the other sub-probe lights passed by the first fiber grating are entered, an i-th grating/delay pair including: a delaying element for delaying those sub-probe lights that are passed by an (i−1)-th fiber grating, for a half of a prescribed phase difference between adjacent time-slots; and an i-th fiber grating for reflecting only a sub-probe light with an i-th wavelength and passing remaining sub-probe lights with wavelengths other than the i-th wavelength among those sub-probe lights that are delayed by the delaying element, where i is an integer greater than one, such that all of the sub-probe lights with the prescribed different wavelengths are reflected by the first fiber grating and fiber grating of the plurality of grating/delay pairs; and a circulator for inputting the sub-probe lights modulated by the modulator into the first fiber grating, and outputting the sub-probe lights reflected from the first fiber grating and the fiber gratings of the plurality of grating/delay pairs as the probe lights.

2. A signal demultiplexing device in a high speed transmission system, for time division demultiplexing high speed multiplexed signal lights in which signal lights with a prescribed identical wavelength are time division multiplexed in terms of time-slots, by converting the high speed multiplexed signal lights into low speed wavelength division multiplexed signal lights, the signal demultiplexing device comprising:

a probe light source configured to generate probe lights formed by a series of sub-probe lights with prescribed different wavelengths for respective time-slots, in synchronization with the high speed multiplexed signal lights;

a wavelength converter configured to receive the probe lights from the probe light source and the high speed multiplexed signal lights, and to convert the prescribed identical wavelength of the high speed multiplexed signal lights in each time-slot into a prescribed wavelength of a probe light in a corresponding time-slot so as to obtain wavelength division multiplexed signal lights; and a wavelength demultiplexer configured to wavelength division demultiplex the wavelength division multiplexed signal lights obtained by the wavelength converter, and to output demultiplexed signal lights;

wherein the probe light source has a plurality of sub-probe light sources configured to respectively generate the sub-probe lights with the prescribed different wavelengths for respective time-slots;

a multiplexer configured to multiplex the sub-probe lights generated by the plurality of sub-probe light sources; and a phase different giving unit configured to give phase differences corresponding to time-slot positions to the sub-probe lights multiplexed by the multiplexer, and to sequentially output the sub-probe lights with the phase differences in correspondence to respective time-slots; and the phase difference giving unit comprises:

a modulation signal generator for generating a plurality of modulation signals in which an (i+1)-th modulation signal has a wavelength which is a half of a wavelength of an i-th modulation signal, where i is an integer; and a plurality of wavelength dependent modulators connected in series, for modulating the sub-probe lights multiplexed by the multiplexer by using the modulation signals, wherein the i-th modulation signal is supplied to an i-th wavelength dependent modulator, a first wavelength dependent modulator modulates a first half of the sub-probe lights at a first half period of a first modulation signal and modulates a second half of the sub-probe lights at a second half period of the first modulation signal, and a j-th wavelength dependent modulator modulates a half of the first half and a half of the second half of the sub-probe lights modulated by a (j−1)-th wavelength dependent modulator at a first half period of a j-th modulation signal and modulates a remaining half of the first half and a remaining half of the second half of the sub-probe lights modulated by the (j−1)-th wavelength dependent modulator at a second half period of the j-th modulation signal, where j is an integer greater than one, such that the sub-probe lights with wavelengths corresponding to respective time-slots are sequentially outputted from a last wavelength dependent modulator as the probe lights.

3. A signal routing device in a high speed transmission system, for time division demultiplexing high speed multiplexed signal lights in which signal lights with a prescribed identical wavelength are time division multiplexed in terms of time-slots, by converting the high speed multiplexed signal lights into low speed wavelength division multiplexed signal lights, and for outputting signal lights by distributing signal lights with desired wavelengths that constitute the low speed wavelength division multiplexed signals into desired time-slots according to routing control signals, the signal routing device comprising:

a probe light source configured to generate probe lights formed by a series of sub-probe lights with variable desired wavelengths for respective time-slots, in synchronization with the high speed multiplexed signal lights;

a wavelength converter configured to receive the probe lights from the probe lights source and the high speed multiplexed signal lights, and to convert the prescribed identical wavelength of the high speed multiplexed signal lights in each time-slot into a prescribed wavelength of a probe light in a corresponding time-slot so as to obtain wavelength division multiplexed signal lights; and a wavelength demultiplexer configured to wavelength division demultiplex the wavelength division multiplexed signal lights obtained by the wavelength converter, and to output demultiplexed signal lights;

wherein the probe light source has:

a plurality of sub-probe light sources configured to respectively generate the sub-probe lights with prescribed different wavelengths for respective time-slots;

a multiplexer configured to multiplex the sub-probe lights generated by the plurality of sub-probe light sources; and a phase different giving unit configured to give phase differences corresponding to time-slot positions to the sub-probe lights multiplexed by the multiplexer, and to sequentially output the sub-probe lights with the phase differences in correspondence to respective time-slots, such that a sub-probe light with a desired wavelength is outputted in correspondence to a desired time-slot according to the routing control signals; and the phase difference giving unit comprises:

a modulator for collectively modulating the sub-probe lights multiplexed by the multiplexer:

a first fiber grating for reflecting only a sub-probe light with a first desired wavelength according to the routing control signal and passing other sub-probe lights with wavelengths other than the first desired wavelength among the sub-probe lights modulated by the modulator;

a plurality of grating/delay pairs connected in series to which the other sub-probe lights passed by the first fiber grating are entered, an i-th grating/delay pair including: a delaying element for delaying those sub-probe lights that are passed by an (i−1)-th fiber grating, for a half of a prescribed phase difference between adjacent time-slots; and an i-th fiber grating for reflecting only a sub-probe light with an i-th desired wavelength according to the routing control signals and passing remaining sub-probe lights with wavelengths other than the i-th desired wavelength among those sub-probe lights that are delayed by the delaying element where i is an integer greater than one, such that all of the sub-probe lights with the prescribed different wavelengths are reflected by the first fiber grating and fiber grating of the plurality of grating/delay pairs; and a circulator for inputting the sub-probe lights modulated by the modulator into the first fiber grating, and outputting the sub-probe lights reflected from the first fiber grating and the fiber gratings of the plurality of grating/delay pairs as the probe lights.

4. A signal routing device in a high speed transmission system, for time division demultiplexing high speed multiplexed signal lights in which signal lights with a prescribed identical wavelength are time division multiplexed in terms of time-slots, by converting the high speed multiplexed signal lights into low speed wavelength division multiplexed signal lights, and for outputting signal lights by distributing signal lights with desired wavelengths that constitute the low speed wavelength division multiplexed signals into desired time-slots according to routing control signals, the signal routing device comprising:

a probe light source configured to generate probe lights formed by a series of sub-probe lights with variable desired wavelengths for respective time-slots, in synchronization with the high speed multiplexed signal lights;

a wavelength converter configured to receive the probe lights from the probe light source and the high speed multiplexed signal lights, and to convert the prescribed identical wavelength of the high speed multiplexed signal lights in each time-slot into a prescribed wavelength of a probe light in a corresponding time-slot so as to obtain wavelength division multiplexed signal lights; and a wavelength demultiplexer configured to wavelength division demultiplex the wavelength division multiplexed signal lights obtained by the wavelength converter, and to output demultiplexed signal lights;

wherein the probe light source has:

a plurality of sub-probe light sources configured to respectively generate the sub-probe lights with prescribed different wavelengths for respective time-slots;

a multiplexer configured to multiplex the sub-probe lights generated by the plurality of sub-probe light sources; and a phase different giving unit configured to give phase differences corresponding to time-slot positions to the sub-probe lights multiplexed by the multiplexer and to sequentially output the sub-probe lights with the phase differences in correspondence to respective time-slots, such that a sub-probe light with a desired wavelength is outputted in correspondence to desired time-slot according to the routing control signals; and the phase differences giving unit comprises:

a modulation signal generator for generating a plurality of modulation signals in which an (i+1)-th modulation signal has a wavelength which is a half of a wavelength of an i-th modulation signal where i is an integer;

a plurality of wavelength dependent modulators connected in series, for modulating the sub-probe lights multiplexed by the multiplexer by using the modulation signals, wherein the i-th modulation signal is supplied to than i-th wavelength dependent modulator, a first wavelength dependent modulator modulates a first half of the sub-probe lights at a first half period of a first modulation signal and modulates a second half of the sub-probe lights at a second half period of the first modulation signal, and a j-th wavelength dependent modulator modulates a half of the first half and a half of the second half of the sub-probe lights modulated by a (j−−1)-th wavelength dependent modulator at a first half period of a j-th modulation signal and modulates a remaining half of the first half and a remaining half of the second half of the sub-probe lights modulated by the (j−1)-th wavelength dependent modulator signal, where j is an integer greater than one, such that the sub-probe lights with wavelengths corresponding to respective time-slots are sequentially outputted from a last wavelength dependent modulator as the probe lights; and a phase controller for variably controlling phases of the plurality of modulation signals from the modulation signal generator according to the routing control signals, such that the sub-probe light with the desired wavelength is outputted to the desired time-slot by the last wavelength dependent modulator.

* * * * *